(12) United States Patent
Dada et al.

(10) Patent No.: US 7,719,970 B1
(45) Date of Patent: May 18, 2010

(54) SERIAL COMMUNICATIONS SYSTEM WITH OPTIONAL DATA PATH AND CONTROL PLANE FEATURES

(75) Inventors: Faisal Dada, Ottawa (CA); Kari Lu, Nepean (CA); Bryon Moyer, Cupertino, CA (US); Venkat Yadavalli, Santa Clara, CA (US); Arye Ziklik, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 1605 days.

(21) Appl. No.: 10/923,593

(22) Filed: Aug. 20, 2004

(51) Int. Cl.
*H04J 3/14* (2006.01)

(52) U.S. Cl. .................. 370/230; 370/282; 370/389

(58) Field of Classification Search .......... 370/475, 370/389; 709/230; 714/805, 807
See application file for complete search history.

(56) References Cited

U.S. PATENT DOCUMENTS

| | | | |
|---|---|---|---|
| 6,324,669 B1 * | 11/2001 | Westby | 714/805 |
| 2003/0169687 A1 * | 9/2003 | Bardini et al. | 370/229 |
| 2004/0260823 A1 * | 12/2004 | Tiwari et al. | 709/230 |

OTHER PUBLICATIONS

SerialLite Protocol Overview, Version 1.1 Jul. 2004, hereafter Serial-Lite.*
"Draft Supplement to IEEE Std.802.3; IEEE draft P802.3ae/D5.0," May 1, 2002, pp. 295-308.
"Aurora Protocol Specification; SP002(v1.1)," pp. 1-64, protocol specification of Xilinx, Inc. (Feb. 14, 2003).
"InfiniBand Architecture Specification vol. 1, Release 1.1" Nov. 6, 2002, pp. 1-211, Specification of the InfiniBand Trade Association.
"InfiniBand Architecture Specification vol. 2, Release 1.1" Nov. 6, 2002, pp. 1-163, Specification of the InfiniBand Trade Association.
"CompactPCI Serial Mesh Backplane Specification; PICMG 2.2 R1.0," Oct. 21, 2002, pp. i-vi and 1-37 Specification of the PCI Industrial Computer Manufacturers Group.
"CSIX-L1: Common Switch Interface Specification-L1," pp. i-v and 1-63, Aug. 5, 2000 Specification of CSIX of Palo Alto, CA.
"RapidIO Interconnect Specification; Part VI: Physical Layer 1x/4x LP-Serial Specification," Rev. 1.2 Jun. 2000, pp. i-xx, VI-1 to VI-136 and Glossary-1 to Glossary-6.
"PCI Express Base Specification, Rev. 1.0a"pp. 34-40 and 119-220.

* cited by examiner

*Primary Examiner*—Kevin C Harper
*Assistant Examiner*—Henry Baron
(74) *Attorney, Agent, or Firm*—Treyz Law Group; G. Victor Treyz; Nancy Y. Ru

(57) ABSTRACT

Integrated circuits compliant with a serial communications protocol with optional features are provided. The optional features include control plane features such as flow control, retry-on-error, clock tolerance compensation, and idle codes and include data path features such as streaming and packetized data modes, configurable data ports and user-defined data channel multiplexing. An integrated circuit compliant with the protocol can transmit streaming data with or without clock tolerance compensation codes. A priority data port can be used to implement retry-on-error functions while user-defined data channels carry user data. The data ports can be individually configured to perform different levels of cyclic redundancy checking. Logic design tools are used to create compliant circuits and systems.

18 Claims, 28 Drawing Sheets

SERIAL COMMUNICATIONS SYSTEM WITH OPTIONAL DATA PATH AND CONTROL PLANE FEATURES

BACKGROUND OF THE INVENTION

This invention relates to serial communications, and more particularly, to serial communications systems that use a serial communications protocol having optional data path and control plane features.

Serial communications formats are often used in modern electronics systems. Serial communications can be faster than parallel communications, use fewer pins, and, particularly when differential signaling schemes are used, can have higher noise immunity.

A number of functions are involved in controlling the operation of a successful serial communications link. Serial communications protocols in which these functions are mandatory can become "heavy" and require a large amount of resources to implement on an integrated circuit. Serial communications protocols that do not support these functions do not require as many resources to implement, but can be inadequate for many communications tasks.

It would be desirable to be able to provide integrated circuits capable of implementing serial communications protocols with optional data path and control plane features.

SUMMARY OF THE INVENTION

In accordance with the present invention, systems and integrated circuits are provided that are compliant with a serial communications protocol having optional features. The serial communications protocol provides support for data path features such as streaming data and packetized data, priority packet nesting, data integrity protection (e.g., using cyclic redundancy checking arrangements), and user-defined channel multiplexing and control plane features such as flow control, retry-on-error, and clock tolerance compensation. These features are optional, which allows a logic designer to decide whether or not circuits in a system should include circuitry for supporting the features. If these features are desired, the logic designer may use logic design tools to produce a circuit that implements the features. When operating in a system, the circuit will automatically perform the functions associated with the features. If these features are not implemented on a circuit, resources will be conserved. The optional features may be adjustable to allow a user to select how the optional feature will work when implemented in a given design.

If desired, a regular data port and a priority data port may be implemented on the same circuit. With this type of arrangement, priority data on the priority data port will be nested within regular data from the regular data port. This type of arrangement allows regular data transmission to be momentarily interrupted by priority data (e.g., for system messages, etc.). Cyclic redundancy checking (CRC) or other data integrity protection schemes may be selectively implemented on the regular and priority data ports. The logic designer can implement data integrity protection in the transmit direction, the receive direction, or both the transmit and receive directions. These various levels of data integrity protection may be provided on each port individually. For example, the logic designer can turn CRC-32 functions on for both the transmit and receive directions in the regular data port, while turning data integrity protection off on the priority data port.

Retry-on-error capabilities may be provided by using the priority data port for all data. With this approach, transmitted data that is not successfully received and acknowledged by the receiving circuit can be retransmitted. The retry-on-error functionality makes serial communications robust, because transmissions with errors can be corrected through data retransmission. The logic designer can use the user-defined channel multiplexing capabilities of the protocol to establish multiple user-defined data channels in the system, even if only the priority port is being used (e.g., to allow retry-on-error to be implemented). The user-defined data channels may be used, for example, to carry system messages.

The regular data port can be configured to support streaming data or packetized data. The optional clock tolerance compensation feature may be turned on or off. For example, the logic designer can create a regular data port with streaming data in which clock tolerance compensation codes are periodically inserted into the streaming data (clock tolerance compensation is on) or in which no clock tolerance compensation codes are introduced (clock tolerance compensation is off).

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to serial communications protocols. More particularly, the present invention relates to systems that use a serial communications protocol with optional data path and control plane functions and methods for providing and using such systems. The data path functions include optional functions such as support for streaming and packetized data, priority packet encapsulation and nesting functions, data integrity protection functions, and user-defined data channel multiplexing functions. The control plane functions include optional functions such as link initialization functions, clock tolerance compensation functions, flow control functions, and retry-on-error functions. Aspects of the invention relate to computer-aided design tools that help logic designers design integrated circuits for systems that are compliant with the serial communications protocols.

The data path and control plane features of the serial communications protocol are optional and adjustable. A logic designer can either conserve integrated circuit resources by forgoing features or can enhance the capabilities of an integrated circuit by implementing features. If the features are implemented, the logic designer can make adjustments to the way in which the features operate.

Serial communications may involve a single path (i.e., a single differential pair of signal wires over which data is conveyed in series) or may involve multiple parallel serial paths (called lanes). In a multi-lane arrangement, a relatively higher-rate serial link is formed from multiple parallel relatively lower-rate serial paths. For example, four lanes operating at about 3.125 Gbps may be used in parallel to support the functions of a 12.5-Gbps serial link. This is merely one illustrative configuration. The data streams from any number of lower-rate serial lanes may be combined to form a higher-rate serial link.

Figure 1:
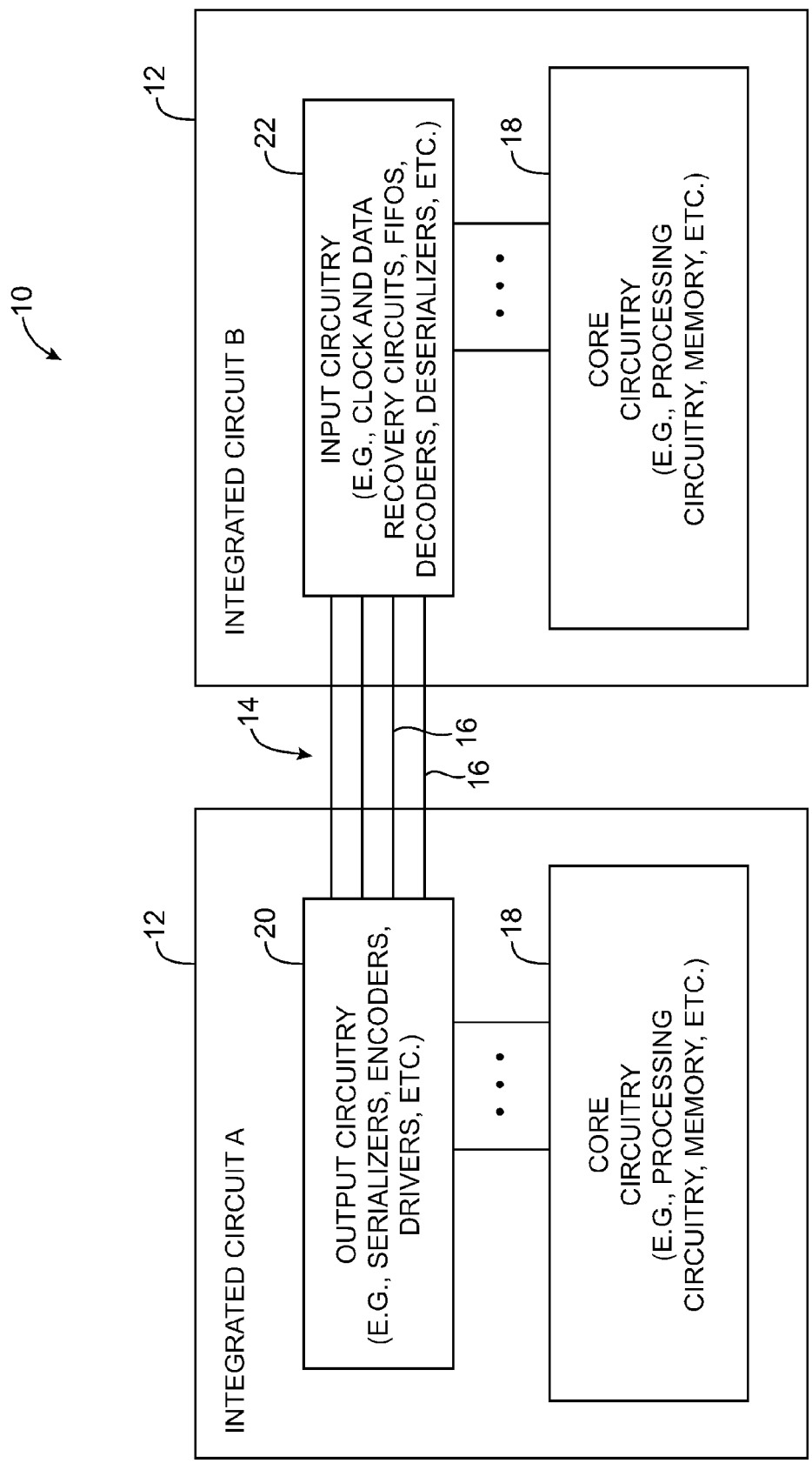
FIG. 1 is a diagram showing how two integrated circuits can communicate over a serial communications link made up of four parallel lanes using a serial communications protocol in accordance with the present invention.

An illustrative system 10 that uses the serial communications protocol is shown in FIG. 1. The equipment of system 10 has two integrated circuits 12 that communicate over a serial communications link 14 that is compliant with the serial communications protocol. The integrated circuits 12 may be used in any suitable electronics equipment. For example, each integrated circuit 12 may be mounted on a different line card connected to a common system backplane in rack-mounted data processing or telecommunications equipment. As another example, integrated circuits 12 may be mounted on the same card or may be used in other types of electronic equipment. Each integrated circuit 12 may be, for example, a programmable logic device, a microprocessor, a digital signal processor, an application-specific integrated circuit (ASIC), etc.

Serial link 14 is generally a high-speed link having a data rate of many Gbps, although slower serial links may be used if desired. Link 14 may be made up of a number of slower parallel serial links (lanes) 16. Each lane 16 may, for example, be formed from a differential signal path having a pair of conductors that support communications at a serial data rate of a few Gbps.

The use of multi-lane serial links such as the illustrative four-lane link 14 of FIG. 1 to support communications between chips in an electrical system such as system 10 helps to overcome some of the difficulties associated with handling single-link serial data streams at extremely high data rates (e.g., 10 Gbps), because each of the lanes 16 has a lower data rate than would be required if all of their serial data were passed through a single pair of differential signal conductors.

When multiple lanes are used in a link 14, the data from within a sending integrated circuit (e.g., a local circuit A) is distributed among the lanes 16 in a particular order and is reconstructed at a receiving integrated circuit (e.g., a remote circuit B).

In general, integrated circuits such as circuits 12 of FIG. 1 may have only transmitting circuitry, may have only receiving circuitry, or may have both transmitting and receiving circuitry. In the example of FIG. 1, integrated circuit A has core circuitry 18 that generates data. Output circuitry 20 may be used to serialize the data from core circuitry 18 and to encode the data to embed a clock in each data stream. Drivers in output circuitry 20 may be used to transmit the data from circuitry 18 to integrated circuit B over the multiple parallel lanes 16 of serial link 14.

At the receiving end of link 14, input circuitry 22 can be used to receive the transmitted data. The input circuitry 22 may include clock and data recovery circuits for extracting embedded clock signals, first-in-first-out (FIFO) buffer circuitry for deskewing and synchronizing the incoming data on the parallel lanes 16. Input circuitry 22 may also include decoding circuitry for decoding data that was encoded in output circuitry 20 and deserializers for converting the serial data from lanes 16 to parallel data. The resulting data is provided to core circuitry 18 on integrated circuit B. Core circuitry 18 may be any type of circuitry, including programmable logic, microprocessor circuitry, digital signal processor circuitry, processing circuitry that is part of an application-specific integrated circuit, memory circuitry, etc.

A serial communications protocol in accordance with the present invention preferably supports data path features such as streaming data and packetized data transmission arrangements, priority data packet encapsulation and nesting, and data integrity protection. A user can also establish a desired number of user-defined data channels (data channel multiplexing).

Integrated circuits in systems that are compliant with the serial communications protocol of the present invention can transmit data in either streaming mode or packet mode. In streaming mode, data is transmitted over link 14 without encapsulating the data in packets. This mode may be appropriate, for example, for transmitting real-time video information. In packet mode, pieces of data are encapsulated in packets. The packets have associated markers which can be used to enable functions such as retry-on-error functions. The streaming and packet modes are preferably optional. A logic designer that can select which of these modes to implement in a given design based on the type of data transmission tasks that need to be handled over the serial link 14.

In packet mode, different types of data may have different associated priority levels. For example, regular data may be transmitted in the form of regular data packets using a regular data port. A priority port may also be provided to allow more important data ("priority data") to be inserted within the regular data, without waiting for a break in transmission. With this type of scheme, priority packets are nested inside of regular data packets. Priority packets are encapsulated between priority packet markers, so that the priority data may be identified as priority data when received and placed on an appropriate priority port at the receiving integrated circuit. The data port and priority port features are preferably optional features.

Data integrity protection may be provided in systems using circuits that are compliant with the serial communications protocol. Data integrity protection is preferably an optional and adjustable feature. This allows a logic designer to select a desired level of protection to implement on a given circuit. A logic designer may, for example, opt to include two-byte (16-bit) cyclic redundancy checking (CRC-16) in a given integrated circuit. Alternatively, the logic designer may chose to implement CRC-32 capabilities or may opt not to include any data integrity protection. Data integrity protection can be implemented independently on the regular and priority data ports.

User-defined channel multiplexing allows a user to set up data channels over the link 14. The user-defined channels may be used for any suitable purpose such as for carrying system messages, etc. The number of user-defined channels is not limited or related to the number of lanes 16 in link 14. For example, link 14 may have 4 lanes and a user may define 16 different user-defined channels, each of which is used to carry a different type of data in the system. The data in the 16 user-defined channels may be carried across link 14 using all of the lanes 16.

The serial communications protocol in accordance with the present invention preferably has certain optional control plane functions such as optional functions related to flow control, retry-on-error operations, and clock tolerance compensation. The protocol also preferably has mandatory functions such as idle character insertion functions.

Flow control capabilities are used when the logic circuitry on a local integrated circuit is capable of generating data faster than the data can be accepted by the remote circuit. To prevent data from being transmitted too rapidly, the remote integrated circuit can issue flow control signals that direct the local circuit to temporarily stop transmitting data. This allows the remote integrated circuit to "catch up" to the local integrated circuit and prevents unnecessary data loss.

Retry-on-error functions are used to help ensure the successful delivery of data to a remote integrated circuit. With this type of arrangement, each outgoing data packet from a local integrated circuit is labeled with a packet number (packet ID). The remote integrated circuit examines incoming packets to determine whether there has been a transmission problem (e.g., a bad packet or an out-of-order packet). Acknowledgement (ACK) and negative acknowledgement (NACK) signals may be transmitted from the remote integrated circuit to the local integrated circuit to inform the local integrated circuit whether or not packets have been successfully received. The local integrated circuit awaits confirmation from the remote integrated circuit that the transmitted data has been successfully received. If the data has been successfully received, the local integrated circuit can transmit additional data. If the data has not been successfully received, the local integrated circuit can resend the data.

When separate clocks are used to operate the local and remote integrated circuits, the clock speeds of the local and remote integrated circuits will not match exactly. To compensate for this mismatch in clock speeds, the local integrated circuit can insert clock tolerance compensation characters into the outgoing data stream. The clock tolerance compensation characters are discarded at the remote integrated circuit. Because this scheme provides extra ("dummy") characters in the data, a local clock that is faster than a remote clock will not overwhelm the remote circuit with too much data.

The local integrated circuit may insert idle characters to fill gaps in the data being transmitted over link 14 to the remote integrated circuit. This ensures that the link operates properly, even when no actual data is being transmitted in the gaps.

Some of the features of the serial communications protocol such as idle code insertion to fill gaps in transmitted data are preferably mandatory. If a circuit does not have the ability to insert idle codes into gaps in the transmitted data, the circuit will not be compliant with the serial communications protocols. Optional features may or may not be incorporated into a given design depending on choices made by the user.

Because the communications protocol has optional data path and control plane features, a user (e.g., a designer of integrated circuits and/or systems) can either include or not include support for these features while still satisfying the serial communications link protocol. A user who is designing an integrated circuit for a system and who decides to include an optional feature will benefit from the enhanced functionality the feature provides. If the user decides not to include support for the optional feature in a given design, resources on the circuit that would otherwise need to be used for implementing the feature will be available to support other functions. For example, a microprocessor that does not include an optional serial communications feature can generally be constructed using less circuit real estate. As another example, forgoing an optional feature on a programmable logic device will free up programmable logic resources for use in supporting other functions on the device.

Although the present invention may be used in the context of any system using any suitable integrated circuits that use serial communications (i.e., microprocessors, digital signal processors, application specific integrated circuits, etc.), the invention will sometimes be described in the context of systems based on programmable logic devices for clarity.

Figure 2:
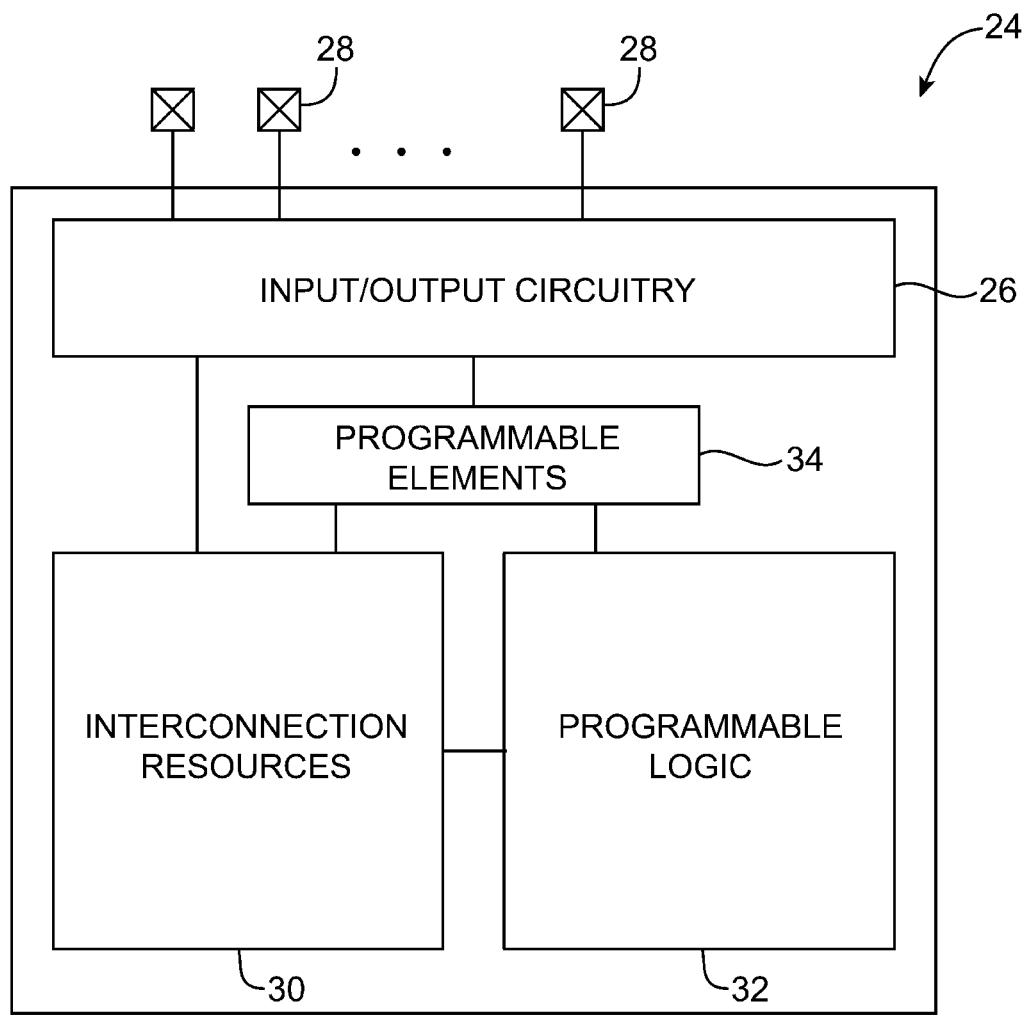
FIG. 2 is a diagram of an illustrative programmable logic device integrated circuit that may communicate using a serial communications protocol in accordance with the present invention.

An illustrative programmable logic device 24 in accordance with the present invention is shown in FIG. 2.

Programmable logic device 24 may have input/output circuitry 26 for driving signals off of device 24 and for receiving signals from other devices via input/output pins 28. Input/output circuitry 26 may include serial communications circuitry such as the output circuitry 20 and input circuitry 22 of FIG. 1. Certain pairs of pins 28 may be associated with respective pairs of differential signal conductors. Each pair of differential signals conductors may be associated with a respective lane 16 (FIG. 1) for supporting high-speed serial communications.

Interconnection resources 30 such as global and local vertical and horizontal conductive lines and busses may be used to route signals on device 24. Programmable logic 32 may include combinational and sequential logic circuitry including logic gates, multiplexers, switches, memory blocks, look-up-tables, logic arrays, etc. These illustrative components are not mutually exclusive. For example, look-up tables and other components that include logic gates and switching circuitry can be formed using multiplexers. Some of the logic of programmable logic device 24 is fixed. Programmable logic 32 includes components that may be configured so that device 24 performs a desired custom logic function.

Programmable logic device 24 may be based on any suitable programmable technology. With one suitable approach, configuration data (also called programming data) may be loaded into programmable elements 34 using pins 28 and input/output circuitry 26. The programmable elements (also sometimes called configuration bits or programmable function control elements) may each provide a static control output signal that controls the state of an associated logic component in programmable logic 32.

In a typical arrangement, the programmable elements 34 may be random-access memory (RAM) cells that are loaded from an external erasable-programmable read-only memory chip via certain pins 28 and appropriate portions of input/output circuitry 26. The loaded RAM cells 34 provide static control signals that are applied to the terminals (e.g., the gates) of circuit elements (e.g., metal-oxide-semiconductor transistors) in programmable logic 32 to control those elements (e.g., to turn certain transistors on or off) and thereby configure the logic in programmable logic 32. Circuit elements in input/output circuitry 26 and interconnection resources 30 are also generally configured by the RAM cell outputs as part of the programming process. The circuit elements that are configured in input/output circuitry 26, interconnection resources 30, and programmable logic 32 may be transistors such as pass transistors or parts of multiplexers, look-up tables, logic arrays, AND, OR, NAND, and NOR logic gates, etc.

RAM-based programmable logic device technology is merely one illustrative example of the type of technology that may be used to implement programmable logic device 24. Other suitable programmable logic device technologies that may be used for device 24 include one-time programmable device arrangements such as those based on programmable logic elements made from fuses or antifuses, programmable logic devices in which elements 34 are formed from electrically-programmable read-only-memory (EPROM) or erasable-electrically-programmable read-only-memory (EEPROM) technology, or programmable logic devices with programmable elements made from magnetic storage elements, etc.

Regardless of the particular type of programmable element arrangement that is used for device 24, programmable elements are preferably provided with configuration data by a user (e.g., a logic designer). Once provided with configuration data, the programmable elements 34 selectively control (e.g., turn on and off) portions of the circuitry in the programmable logic device 24 and thereby customize its functions so that it will operate as desired.

The circuitry of device 24 may be organized using any suitable architecture. As an example, the logic of programmable logic device 24 may be organized in a series of rows and columns of larger programmable logic regions or areas each of which contains multiple smaller logic regions or areas (e.g., areas of logic based on look-up tables or macrocells). These logic resources may be interconnected by interconnection resources such as associated vertical and horizontal interconnection conductors. Interconnection conductors may include global conductive lines that span substantially all of device 24, fractional lines such as half-lines or quarter lines that span part of device 24, staggered lines of a particular length (e.g., sufficient to interconnect several logic areas), smaller local lines that interconnect small logic regions in a given portion of device 24, or any other suitable interconnection resource arrangement. If desired, the logic of device 24 may be arranged in more levels or layers in which multiple large areas are interconnected to form still larger portions of logic. Still other device arrangements may use logic that is not arranged in rows and columns. Portions of device 24 (e.g., in input/output circuitry 26 and elsewhere) may be hardwired. As an example, hardwired transmitter and receiver circuitry may be used to assist in serial communications functions. Hardwired digital signal processing circuitry (e.g., multipliers, adders, etc.) may also be used.

Figure 3:
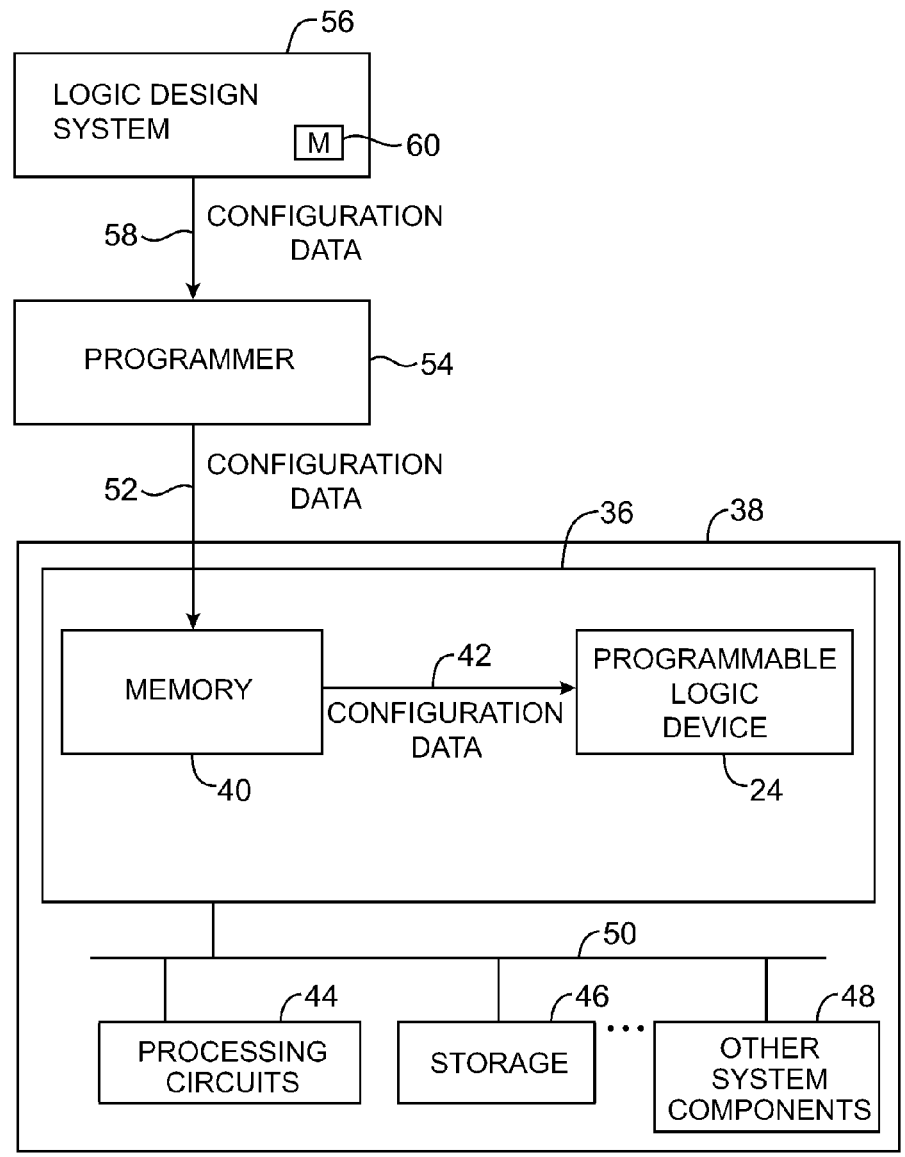
FIG. 3 is a diagram showing how configuration data may be generated for a programmable logic device integrated circuit in accordance with the present invention.

An illustrative system environment for a programmable logic device 24 is shown in FIG. 3. Programmable logic device 24 may be mounted on a board 36 in a system 38. In general, programmable logic device 24 may receive programming data from programming equipment or from any other suitable equipment or device. In the example of FIG. 3, programmable logic device 24 is the type of programmable logic device that receives configuration data from an associated memory chip 40. With this type of arrangement, memory chip 40 may, if desired, be mounted on the same board 36 as programmable logic device 24. The memory 40 may be an erasable-programmable read-only memory (EPROM) chip, a PLD configuration data loading chip with built-in memory, or other non-volatile memory device. When system 38 boots up (or at another suitable time), the configuration data for configuring the programmable logic device may be supplied to programmable logic device 24 from device 40, as shown schematically by path 42. The configuration data that is supplied to the programmable logic device may be stored in the programmable logic device in configuration data cells (memory).

System 38 may include processing circuits 44, storage 46, and other system components 48 which may, if desired, contain circuitry that is compliant with the serial communications protocol of the invention. The components of system 38 may be located on one or more boards such as board 36 or other suitable mounting structures or housings and may be interconnected by busses and other electrical paths 50, which may include single-lane and multi-lane serial communications links.

Memory 40 may be supplied with the configuration data for device 24 over a path such as path 52. Memory 40 may, for example, receive the configuration data from a programmer 54 (e.g., an EPROM programmer) or other suitable equipment that stores this data in memory 40.

It can be a significant undertaking to design and implement a desired logic circuit in a programmable logic device and to perform other system design activities. Logic designers therefore generally want to use logic design systems based on computer-aided-design (CAD) tools to assist them in designing circuits and systems. A logic design system can help a logic designer design and test complex circuits for a system. When a design is complete, the logic design system may be used to generate configuration data for programming the appropriate programmable logic device or mask sets for creating a custom chip.

As shown in FIG. 3, the configuration data produced by a logic design system 56 may be provided to programmer 54 over a path such as path 58. The programmer 54 can program the configuration data into memory 40, so that memory 40 can later provide this configuration data to the programmable logic device 24 over path 42.

In arrangements of the type shown in FIG. 3, the programmable logic device 24 may have configuration data cells formed from memory cells such as static random-access memory cells. This is merely one illustrative arrangement for programming a programmable logic device 24. Any suitable arrangement for programming programmable logic device 24 may be used if desired. For example, programmable logic device 24 may be based on non-volatile configuration data cells such as erasable-programmable read-only memory (EPROM) cells. With this type of arrangement, device 24 can be configured by programming the configuration data into the EPROM cells on the device. Programmable logic device 24 may also be based on programmable elements such as fuses and antifuses or programmable elements based on other technologies (e.g., magnetic devices, etc.).

Regardless of the particular approach used for programming programmable logic device 24, programmable logic device 24 can be configured using configuration data produced by a logic design system 56.

Logic design system 56 includes storage 60. Software is used to implement the functions of system 56. The software may be stored on a computer-readable medium (storage) 60. Storage 60 may include computer memory chips, removable and fixed media such as hard disk drives, flash memory, compact discs (CDs), DVDs, and floppy diskettes, tapes, or any other suitable memory or storage device(s). When the software of system 56 is installed, storage 60 has instructions and data that cause the computing equipment in logic design system 56 to execute various methods (processes). When performing these processes, the computing equipment is configured to implement the functions of the logic design system 56.

Figure 4:
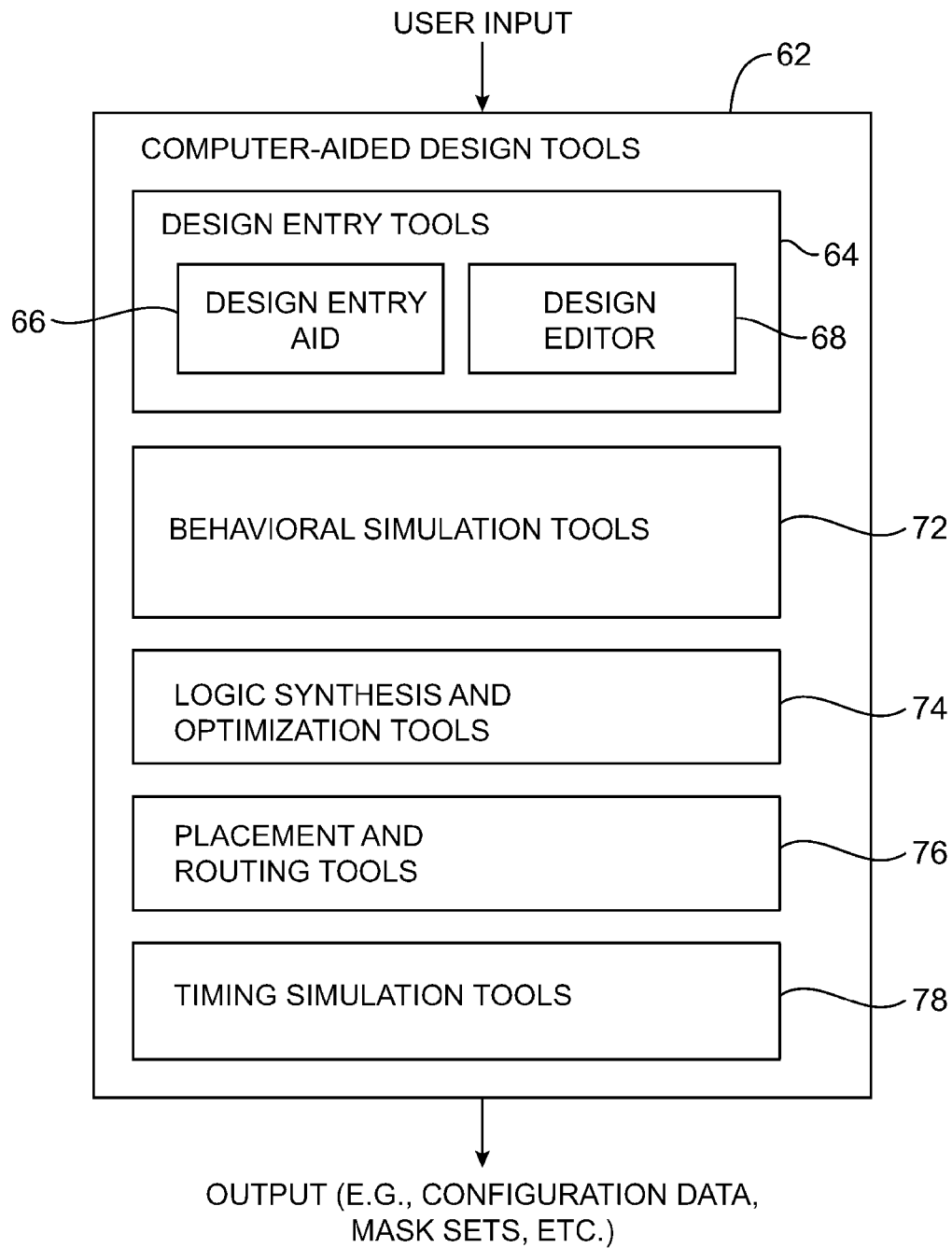
FIG. 4 is a diagram showing how computer-aided design tools may be used to create a logic design based on user input in accordance with the present invention.

Logic design system 56 may use computer-aided design tools such as tools 62 of FIG. 4. Tools such as tools 62 may be used to produce the configuration data for the programmable logic device 24 from a set of design specifications or other suitable input. Tools such as tools 62 can also be used to generate output in other suitable formats (e.g., as specifications for lithographic mask sets for semiconductor fabrication of a desired integrated circuit, etc.).

The design process typically starts with the formulation of logic circuit functional specifications. A logic designer can specify how a desired circuit should function using design entry tools 64. Design entry tools 64 may include tools such as design entry aid 66 and design editor 68. Design entry aids 66 help a logic designer locate a desired design from a library of existing logic designs and may provide computer-aided assistance to the logic designer for entering (specifying) the desired design. As an example, design entry aid 66 may be used to present screens of options for a user. In accordance with the present invention, these on-screen options may allow a user to select which optional data path and control plane features the user desires to implement in a given logic design. The user may, for example, click on the on-screen options to select whether the circuit being designed should have streaming data capabilities or packetized data capabilities, whether the circuit should have a priority data port (e.g., to nest priority data within regular data), which data integrity protection features the data port and priority of a circuit should have (e.g., no protection, CRC-16 protection, or CRC-32 protection), whether flow control functions should be implemented, whether the circuit should have retry-on-error capabilities or clock tolerance compensation code capabilities, etc. Design editor 68 may be used to enter a design (e.g., by entering lines of hardware description language code), may be used to edit a design obtained from a library (e.g., using a design entry aid), or may assist a user in selecting and editing appropriate prepackaged code/designs.

Design entry tools 64 may be used to allow a logic designer to provide a desired logic design to logic system 62 using any suitable format. For example, design entry tools 64 may include tools that allow the logic designer to enter a logic design using truth tables. Truth tables can be specified using text files or timing diagrams and may be imported from a library. Truth table logic design entry may be used for a portion of a large circuit or for an entire circuit.

As another example, design entry tools 64 may include a schematic capture tool. A schematic capture tool may allow the logic designer to visually construct logic circuits from constituent parts such as logic gates and groups of logic gates. Libraries of preexisting logic circuits may be used to allow a desired portion of a design to be imported with the schematic capture tools.

If desired, design entry tools 64 may allow the logic designer to provide a logic design to the logic design system 56 using a hardware description language such as Verilog hardware description language (HDL) or Very High Speed Integrated Circuit Hardware Description Language (VHDL). The logic designer can enter the logic design by writing hardware description language code with editor 68. Blocks of code may be imported from libraries if desired.

After the design has been entered using design entry tools 64, behavioral simulation tools 72 may be used to simulate the functional performance of the design. If the functional performance of the design is incomplete or incorrect, the logic designer can make changes to the design using design entry tools 64. The functional operation of the new design can be verified using behavioral simulation tools 72 before synthesis operations have been performed using tools 74. Simulation tools such as tools 72 may also be used at other stages in the design flow if desired (e.g., after logic synthesis). The output of the behavioral simulation tools 72 may be provided to the logic designer in any suitable format (e.g., truth tables, timing diagrams, etc.)

Once the functional operation of the logic design has been determined to be satisfactory, logic synthesis and optimization tools 74 may be used to implement the logic design in a particular programmable logic device (i.e., in the logic and interconnect resources of a particular programmable logic device product or product family). As an example, if the logic design has serial communications circuitry that supports automatic lane polarity reversal, the logic synthesis and optimization tools 74 may decide to use an available hardwired automatic polarity detection and reversal circuit on the programmable logic device to perform the desired polarity reversal function. Tools 74 may, alternatively, implement the polarity reversal functions using a "soft" design—i.e., using mostly or entirely programmable logic resources.

Tools 74 can optimize the design by proper selection of the available hardware to implement different logic functions in the logic design. Often tradeoffs are made because multiple logic functions are competing for limited resources.

After logic synthesis and optimization using tools 74, the logic design system may use tools such as placement and routing tools 76 to perform physical design steps (layout synthesis operations). Placement and routing tools 76 are used to determine how to place the circuits for each logic function within the programmable logic device. For example, if two counters interact with each other, the placement and routing tools 76 may locate these counters in adjacent logic regions on the programmable logic device to minimize interconnect delays. The placement and routing tools 76 create orderly and efficient implementations of logic designs for a given programmable logic device.

After an implementation of the desired logic design in the programmable logic device has been generated using placement and routing tools 76, the implementation of the design may be tested using simulation tools such as timing simulation tools 78. Timing simulation tools may, for example, predict the delay times that are associated with certain signal paths through the device. The timing simulation tools may be used to verify that the particular implementation of the design that is being tested does not contain signal paths with delays that are outside of the limits imposed during the design phase. For example, the timing simulation tools may be used to ensure that the slowest data paths are fast enough that the minimum desired clock speed and minimum signal path delay constraints are satisfied. The timing simulation tools may also examine the design for potential race conditions or other conditions that affect device performance.

After satisfactory testing using tools 78, the CAD tools 62 can produce the configuration data for the programmable logic device or can generate other suitable output data (e.g., the specifications for a lithographic mask set for fabricating an integrated circuit incorporating the logic design). Depending on the type of programmable logic device being used (e.g., a device based on non-volatile memory, a device based on volatile memory, a device based on fuses or antifuses, etc.), configuration data may be programmed into the programmable logic device directly or may be provided to a memory device that later (e.g., upon power-up) loads the configuration data into the programmable logic device to program the device.

In a typical system 10, there are multiple integrated circuits that communicate using the serial communications protocol of the present invention. The logic designer can use system 56 and tools 62 to design the serial communications circuitry for each of the integrated circuits.

To assist a logic designer in choosing among optional data path and control plane functions, computer-aided design tools 62 (e.g., design entry tools 64) can be used to provide the logic designer with on-screen options with which the logic designer can make feature choices. As an example, tools 64 may present a user with a screen containing clickable items for the user to select. The user may click on a "regular data port" option when the user desires to send data using a regular data port. If the regular data port option is selected, the user may be allowed to select between streaming and packetized data mode delivery options. The user may click on a "priority data port" option when the user desires to send a data using a priority data port. If the priority data port option is selected, the user may be presented with a retry-on-error option that can be selected to implement retry-on-error functions. Options relating to data integrity protection (e.g., whether or not to protect data, the level of CRC protection desired, and the direction to protect—incoming to the receiver, outgoing from the transmitter, or both), may also be presented to the user. The on-screen options may include buttons, drop-down menus, fillable boxes, tabs, or any other suitable graphical user interface options.

If the user would like a circuit design to handle streaming data (as an example), the user can select an option with tools 62 that will cause tools 62 to include streaming data functionality into the circuit design. Similarly, the functionality for other data path and control plane operations can be selectively incorporated into the circuit design by appropriate selection of the on-screen options that are presented by the design entry tools 64.

By using on-screen options or by otherwise providing the user with an opportunity to choose which optional features to include in a given integrated circuit design, the computer-aided design tools 62 (e.g., the design entry tools such as design entry aid 66 and/or design editor 68) allow the user to increase functionality (at the expense of increased resource consumption) or allow the user to reduce resource consumption (at the expense of reduced functionality) while still producing a protocol-compliant design.

When the user has finished selecting the desired options for the design, the user may click on a "finish" option. The computer-aided design tools 62 may then be used to complete the design process.

If, for example, the logic designer is designing circuitry to be implemented in a programmable logic device, the computer-aided design tools 62 may be used to complete the design process by producing configuration data for programming a programmable logic device. The configuration data that is created will reflect the inclusion of the desired optional features that have been selected by the user. When loaded into a programmable logic device, the configuration data will configure the programmable logic on the device to implement the desired features while simultaneously configuring the programmable logic on the device so that resources are conserved by not implementing the undesired features. If desired, all of the optional data path and control plane features and other serial link communications features may be included or many of these optional features may be omitted.

If the logic designer is designing circuitry for integrated circuits such as microprocessors, digital signal processors, or other such circuits (including programmable logic devices) whose serial communications circuitry is exclusively or at least partially hardwired, the output of the computer-aided design tools 62 may be used to complete the design process by producing specifications for lithographic mask sets for fabricating these integrated circuits. The circuitry produced using such mask sets will include the desired optional features (and will consume associated resources) and will not include the undesired features (while conserving associated resources).

Figure 5:
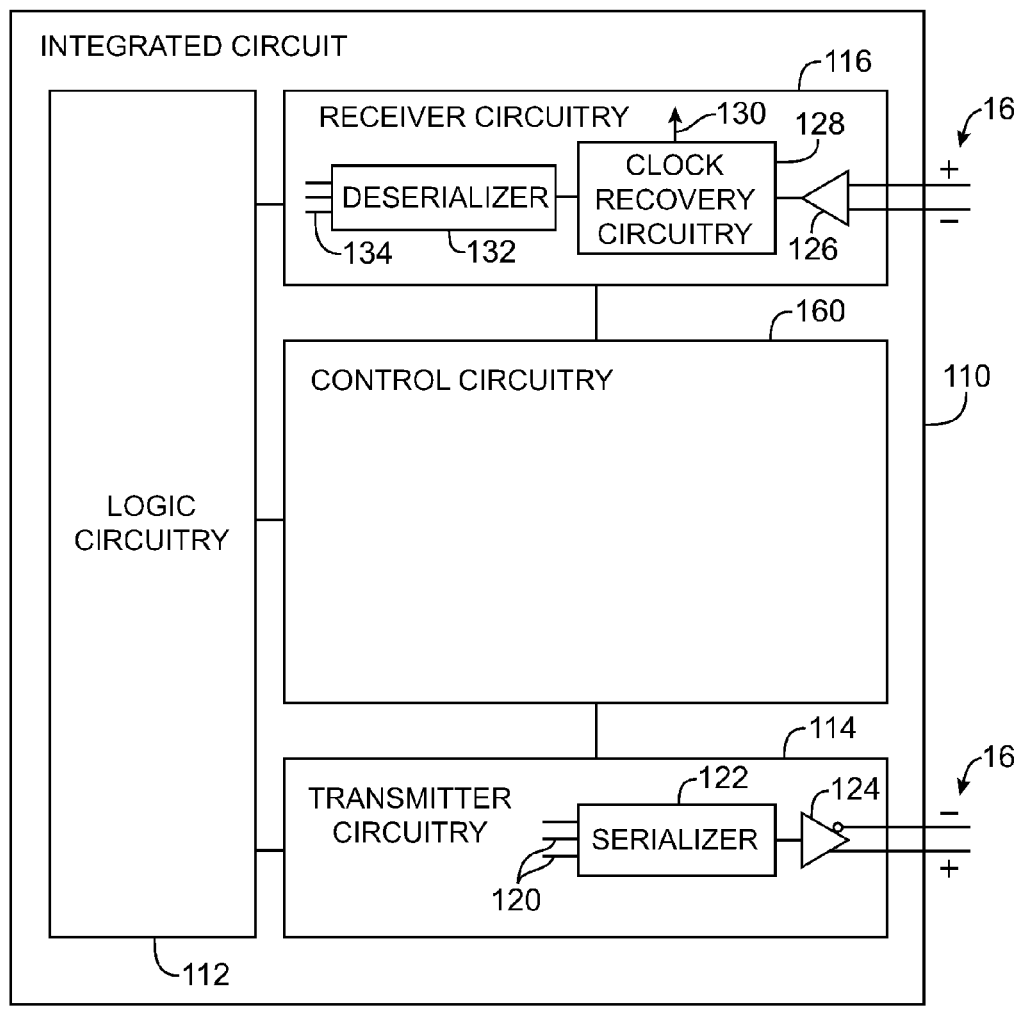
FIG. 5 is a diagram of an illustrative integrated circuit with serial communications circuitry constructed in accordance with the present invention.

A diagram of an illustrative integrated circuit 110 that includes circuitry 160 suitable for performing the optional data path and control plane functions is shown in FIG. 5. Integrated circuit 110 may be a programmable logic device, microprocessor, digital signal processor, application specific integrated circuit, or other suitable integrated circuit. If circuit 110 is a programmable logic device, logic circuitry 112 on integrated circuit 110 will typically include programmable logic such as programmable logic 32 of FIG. 2 and hardwired logic. For other types of integrated circuit, logic circuitry 112 is generally hardwired digital logic circuitry.

Integrated circuit 110 may transmit digital data signals from logic circuitry 112 to other integrated circuits using transmitter circuitry 114. Receiver circuitry 116 may be used to receive digital data signals for logic circuitry 112 from other integrated circuits.

Transmitter circuitry 114 and receiver circuitry 116 are controlled by control circuitry 160. Circuitry 160 may include circuits for implementing the data path and control plane functions of circuit 110. The circuitry of control circuitry 160 and circuitry 114 and 116 need not be mutually exclusive. For example, priority data port operations may be performed using circuitry 160 and circuitry in transmitter circuitry 114 and receiver circuitry 116.

Transmitter circuitry 114 receives signals from logic circuitry 112. Parallel inputs 120 may be used to provide data from logic circuitry 112 to serializer 122. Serializer 122 may serialize parallel data on inputs 120 so that the data can be transmitted over a serial link having one or more lanes. A differential driver 124 may drive serial data from the output of serializer 122 onto two parallel differential signal lines in lane 16. In the example of FIG. 5, there is only a single lane 16 associated with transmitter circuitry 114. This is merely illustrative. In general there may be one or more parallel lanes in a given serial link 14, as shown in FIG. 1.

Receiver circuitry 116 of FIG. 5 has a differential input driver 126 that receives data from another integrated circuit over a lane 16. Only a single lane 16 is associated with the receiver circuitry 116 in the example of FIG. 5. This is merely illustrative. Multiple parallel lanes in a serial link may be associated with receiver circuitry 116 if desired.

The differential data at the two inputs of differential input driver 126 of receiver circuitry 116 is provided to clock-and-data recovery (CDR) circuitry 128. Clock-and-data recovery circuitry 128 extracts embedded clock information from the incoming signal and provides the extracted clock signals at line 130. Recovered serial data is provided to deserializer 132. Deserializer 132 deserializes the data provided by clock recovery circuitry 128 and provides corresponding parallel data at output lines 134. The parallel data from output lines 134 may be distributed to logic circuitry 112.

The receiver circuitry 116, control circuitry 160, and the transmitter circuitry 114 are used to support serial communications in accordance with the serial communications protocol of the present invention. In a given integrated circuit, the amount and type of circuit resources present in circuitry 114, 116, and 160 depends on which optional serial communications features were included by the designer. For example, during the design process, the designer may have clicked on a "streaming data" data mode option that was presented by tools 64 (FIG. 4). In this case, when the integrated circuit is implemented as a chip, the chip will have control circuitry 160 that includes regular data port circuitry 111 that is capable of handling streaming data. If, however, the logic designer clicked on a "packetized data" data mode option presented by tools 64, the chip will have control circuitry 160 that includes circuitry for handling packetized data rather than streaming data.

Similarly, the logic designer may have clicked on a CRC-16 data integrity protection feature presented by tools 64 during the design process. In this case, when the integrated circuit is implemented as a chip, the chip will have control circuitry 160 that includes circuitry for performing CRC-16 operations. If, however, the logic designer clicked on an option presented by tools 64 that indicates that there should be no data integrity protection, the chip will have control circuitry 160 that does not include circuitry for CRC operations.

The situation is similar for other options. For example, if the user chose to include a regular data port and a priority data port, the circuit will be implemented such that control circuitry 160 includes circuitry that nests priority packets within regular data packets as needed. If the user chose not to include these functions in the design, the circuit will be implemented such that control circuitry 160 does not include the undesired functions.

These different implementations—i.e., the chips that have various configurations of circuitry—are compliant with the serial communications protocol of the present invention. The implementations with fewer data path and control plane features will consume fewer logic resources on the integrated circuit and may therefore be less complex and less expensive. The implementations with relatively more (or all) of the data path and control plane features will have added functionality.

Figure 6:
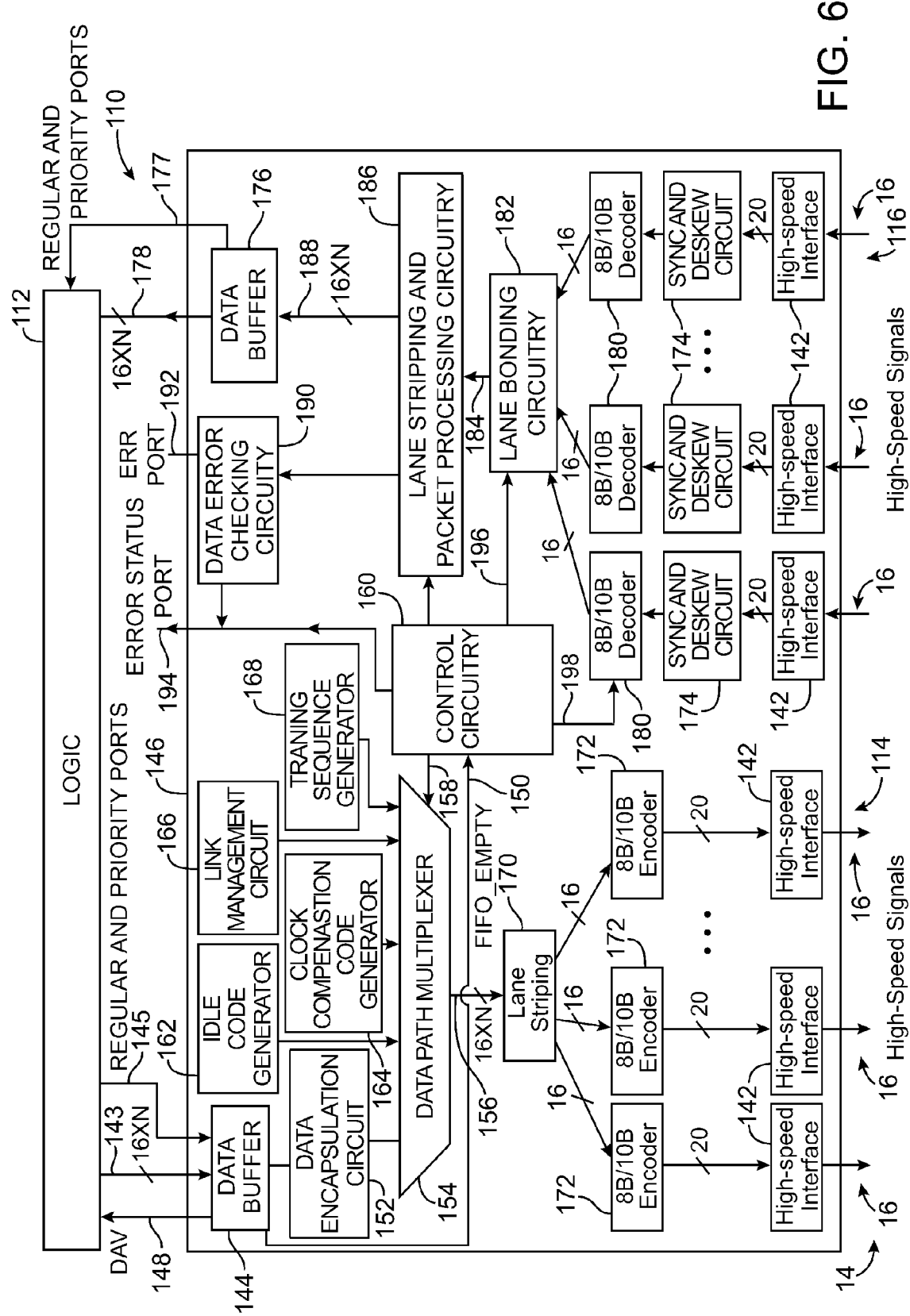
FIG. 6 is a more detailed diagram of an illustrative integrated circuit with serial communications circuitry constructed in accordance with the present invention.

An illustrative integrated circuit 110 which may be used to transmit and receive serial data in accordance with the serial communications protocol of the present invention is shown in FIG. 6. Integrated circuit 110 of FIG. 6 has input/output circuitry 146. Input/output circuitry 146 may, for example, be input/output circuitry such as circuitry 26 of FIG. 2 for integrated circuits 110 that are programmable logic devices.

Input/output circuitry 146 of integrated circuit 110 includes serial communications circuitry. For example, input/output circuitry 146 has transmitter circuitry 114 for transmitting data over one or more lanes 16 of serial link 14. Integrated circuit 110 also has receiver circuitry 116 for receiving serial communications from another integrated circuit over one or more lanes 16. High-speed interface circuitry 142 in the transmitter circuitry 114 includes serializer and driver circuitry such as serializer 122 and driver 124 of FIG. 5. High-speed interface circuitry 142 in the receiver circuitry 116 may include components such as the differential input driver 126, clock-and-data recovery circuitry 128, and deserializer circuitry 132 of FIG. 5.

Each lane 16 has two differential signal lines—a positive (+) line and a negative (−) line (shown in more detail in FIG. 5). To support two-way traffic, link 14 has both outgoing pairs of signal lines connected to transmitter circuitry 114 and incoming pairs of signal lines connected to receiver circuitry 116. The number of lanes 16 in link 14 is given by the integer N in FIG. 6. The value of N may be 1 (in a single-lane link) or may be more than 1. As an example, in a four-lane serial link 14 having four outgoing pairs of differential signal lines and having four incoming pairs of differential signals lines, the value of N is 4.

Data to be transmitted over link 14 from integrated circuit 110 to another integrated circuit is passed from logic 112 to data buffer 144 over paths such as path 143. In the example of FIG. 6, data words have 16 bits and the size of path 143 is N×16, where N is the number of lanes in link 14 (as an example).

Buffer 144 may be used to help provide an interface between logic 112 and input-output circuitry 146. When no more data can be accepted from logic 112 because the buffer is full (e.g., because first-in-first out (FIFO) circuitry in buffer 144 is full), the DAV signal on line 148 may be deasserted. Logic 112 may monitor the status of DAV to determine whether or not buffer 144 is ready to accept data. When the FIFO (or other suitable buffer circuitry) in buffer 144 is empty, the FIFO_EMPTY signal on line 150 may be asserted. When control circuitry 160 receives a FIFO_EMPTY signal from data buffer 144, the control circuitry 160 may insert idle codes into the outgoing data.

If desired, data from data buffer 144 may be encapsulated as packets using data encapsulation circuit 152. During the encapsulation process, a data payload may be encapsulated between start-of-packet (SOP) and end-of-packet (EOP) markers.

Regular and priority data can be implemented using data buffer 144. Data buffer 144 may have associated regular and priority data and address ports, shown schematically by line 145 in FIG. 6.

A data path multiplexer 154 or other suitable signal routing circuitry may be used to route the data to be transmitted to the final stages of the transmitter. Data path multiplexer 154 may have multiple inputs and a single output 156.

Control circuitry 160 may control the operation of input/output circuitry 146. For example, control circuitry 160 may control data path multiplexer 154 via control path 158. By controlling which control signals are applied to data path multiplexer 154 via control path 158, the control circuitry 160 can select which of the data path multiplexer's inputs is connected to the output 156. When, for example, it is desired to transmit data from data buffer 144 over link 14, the control circuitry 160 can direct the multiplexer 154 to connect the input connected to data encapsulation circuit 152 to output 156.

Data on the other multiplexer inputs may be routed to output 156 as appropriate. Data from idle code generator 162 may be routed through multiplexer 154 when it is desired to transmit idle codes. Clock tolerance compensation sequences (codes) from clock compensation code generator 164 may be inserted into the transmitted data to compensate for mismatches between the clock of integrated circuit 110 and the clock of the integrated circuit to which data is being transmitted over link 14. The clock compensation codes may be discarded at the receiver of the receiving integrated circuit to accommodate the clock mismatch.

Link management circuit 166 may be used to handle the generation of link management instructions (packets) for flow control operations, retry-on-error operations, etc. Multiplexer 154 may be used to send these link management instructions into the data stream when appropriate.

Training sequence generator 168 may be used to generate training sequences that are used during link initialization. Training sequence generator 168 may, for example, generate a first training sequence called TS1 and a second training sequence called TS2, which are used at various stages of the link initialization process. The training sequences TS1 and TS2 include handshaking information that is used to bring up link 14 during link initialization. Other types of training sequence information can be generated by generator 168 if desired.

Lane striping circuitry 170 may be used to distribute the 16×N bits of parallel data on output 156 among the N lanes 16. Two bytes of data may be distributed among the lanes at a time, which ensures that transmitted data is word aligned.

Encoders 172 (e.g., 8B/10B encoders or other suitable encoders) may be used to convert 8-bit bytes of data into corresponding 10-bit coded words. The coded words supplied at the outputs of the encoders have the same information content as the data provided to their inputs. The additional bits in the coded words ensure that there are a sufficient number of high-to-low and low-to-high transitions in the data to allow successful clock extraction at the receiver. At the receiver, circuitry such as clock-and-data recovery circuitry 128 of FIG. 5 can be used to extract the embedded clock signal from the encoded data.

After passing through encoders 172, the outgoing data may be transmitted across link 14 on respective lanes 16 using the serializer and driver circuitry of high-speed interfaces 142. Typically the data being transmitted over link 14 is high-speed data (e.g., data transmitted at data rates of 100s of Mbps or Gbps).

Incoming data from the integrated circuit at the other end of link 14 may be received by the input drivers, clock-and-data recovery circuitry, and deserializers of the high-speed interface circuitry 142 in receiver circuitry 116. When there is more than one lane 16 of incoming data, synchronization and deskewing circuitry 174 may be used to synchronize and deskew the incoming data so that it can be successfully merged into a single stream of data suitable for transmission to logic 112 via data buffer 176 and path 178. Data buffer 176 may include first-in-first-out (FIFO) buffer circuitry. In a given integrated circuit design, the proper size of the FIFO in buffer 176 may be selected using the FIFO sizer capabilities of the logic design tool. Buffer 176 may be used to implement a regular data port and a priority data port and may have associated data and address ports 177 for regular data and priority data, which may be monitored by logic 112.

Decoders 180 may be used to decode incoming data (e.g., from 10-bit codes to 8-bit data bytes). Lane bonding circuitry 182 may be used to merge multiple lanes of data into a single data path 184. Lane stripping and packet processing circuitry 186 may be used to remove data encapsulation information from the incoming data (e.g., to remove SOP and EOP characters). Stripped data may be provided at output 188.

Data error checking circuitry 190 may be used to check received data for errors (e.g., errors such as cyclic redundancy check (CRC) errors, 8B/10B errors or other decoding errors, etc.). If data error checking circuitry 190 detects an error, a suitable error signal may be generated. For example, an error signal may be asserted on ERR port 192 when an error is detected during retry-on-error operations. If a catastrophic error is detected, a catastrophic error signal may be produced by data error checking circuitry 190 and placed on error status port 194. Control circuitry 160 can also generate catastrophic error signals for port 194 when appropriate. Ports such as port 192 and 194 may be monitored by logic 112.

The way in which the circuitry of FIG. 6 is implemented depends on which optional serial communications link features the logic designer (user) chose when designing the integrated circuit 110 using tools 62. For example, if the user chose to include the flow control feature, the resulting integrated circuit 110 will have flow control capabilities. The optional serial communications link features can be implemented by proper configuration of input/output circuitry 146 (i.e., transmitter circuitry 114, control circuitry 160, and receiver circuitry 116).

Operations such as those involved in handling streaming data and packetized data, priority packet encapsulation and nesting, data integrity protection, link initialization, clock tolerance compensation, flow control, and retry-on-error operations are generally two-sided processes. For clarity, such operations are often described herein in the context of a "local" integrated circuit that communicates over link 14 with a "remote" integrated circuit. The local integrated circuit's transmitting circuitry is often transmitting information to the receiving circuitry of the remote circuit while the transmitting circuitry of the remote circuit is transmitting information to the receiving circuitry of the local circuit. To operate a bidirectional serial link 14 between the local and remote circuits, both the local and remote circuits must transmit and receive signals.

Serial communications circuitry constructed in accordance with the serial communications protocol of the present invention may insert idle characters into gaps in the transmitted data. The idle code feature is preferably mandatory (not optional).

If gaps were permitted to remain in the transmitted data, there would be potentially large periods of time during which no signals would be transmitted across link 14. This would disrupt the link, because the phase-locked-loop or delay-locked loop circuitry in the clock-and-date recovery circuit of the receiver would lose frequency lock on the data. As a result, control circuitry 160 preferably uses idle code generator 162 and data path multiplexer 154 (FIG. 6) to insert idle codes into gaps in the transmitted data. The idle codes serve as a type of "dummy data" that keeps the link 14 active even when no actual data needs to be transmitted.

Any suitable characters may be used as idle codes. For example, the idle code generator 162 may produce a preferably randomized sequence of /R/ and /K/ characters at its output with alignment characters /A/ inserted randomly every 16-31 clock cycles. This sequence of idle characters may be used to fill gaps (e.g., by merging these characters into the data path using data path multiplexer 154 of FIG. 6). The randomness of the /R/s, /K/s, and the /A/s reduces electromagnetic interference (EMI) (i.e., radiated noise) on the lines in link 14. When the idle characters are received at the remote end of the link 14, they may be discarded (ignored). The /A/s are used by the deskewing circuitry in the remote receiver to align lanes 16.

The use of idle characters helps ensure that data gaps do not affect the integrity of the link. The use of idle characters is preferably mandatory in integrated circuits that are compliant with the serial communications protocol of the present invention. Other features are optional.

For example, the inclusion of clock tolerance compensation circuitry such as clock compensation code generator 164 in integrated circuit 110 is optional. Circuits can be designed using tools 62 of FIG. 4 that either include or do not include circuitry for compensating for mismatches between local and remote clocks. Both types of circuits will still be compliant with the serial communications protocol of the present invention and will be able to communicate under the proper circumstances.

Clock tolerance compensation circuitry is generally needed when a local integrated circuit and remote integrated circuit do not share a common clock, because there will be a mismatch between clocks that are nominally identical. The clock compensation circuitry can be omitted to save resources when a common clock is available. When clock tolerance compensation circuitry is used, clock tolerance compensation codes are inserted into the transmitted at regular intervals. At the receiver, the inserted codes are discarded. When the remote clock is slower than the local clock, the reception and discarding of the clock compensation codes prevents data from being lost. If the clock compensation codes are not inserted in this type of situation, the faster transmitter may overwhelm the receiver with data. Clock compensation capabilities may optionally be used in circuit configurations in which the data path includes streaming data or packetized data.

Another optional serial communications link feature in the serial communications protocol relates to retry-on-error operations. With a retry-on-error scheme, the remote integrated circuit actively acknowledges successfully received data (packets). The local integrated circuit retains transmitted data temporarily in a circular buffer. If the transmitted data is not received properly, it can be retransmitted. The retry-on-error feature, when implemented, therefore helps to ensure successful transmission of data between the local and remote integrated circuits.

When the retry-on-error feature is implemented, data buffer 144 generally includes first-in-first-out (FIFO) buffer circuitry and circular buffer circuitry. Data from logic 112 is initially placed in the FIFO. The circular buffer circuitry may be loaded from the FIFO. The circular buffer consists of discrete "cells", each of which holds a packet. Once the cells are all full, new data cannot be loaded from the FIFO until a cell is cleared.

Data in the circular buffer is transmitted from the local integrated circuit to the remote integrated circuit over link 14. Data is retained in the circular buffer until its reception is acknowledged by the remote integrated circuit. The retained data is available to be retransmitted to the remote integrated circuit in the event of a transmission error.

Each transmitted packet is labeled with a packet number. At the remote integrated circuit, packets are checked. If a bad packet is received or if a packet is received out of order, the remote integrated circuit may ask the local integrated circuit to retransmit the packet or packets. Properly received packets are acknowledged so that the local integrated circuit can load new data into the circular buffer for transmission.

A regular data port and a priority data port are available for implementation by a user. With the regular data port, the user may either stream data or send data as packets. Retry-on-error functionality may be provided by using the priority data port. Use of the priority data port also makes it possible to nest higher-priority data (priority data from the priority port) into regular data (from the regular data port). Data integrity protection is available for users of both the regular data port and the priority data port.

Multiple levels of nesting are permitted. For example, a link management packet (from link management circuit 166 of FIG. 6) may be nested within a priority packet, which in turn is nested within a regular data packet. Clock tolerance compensation sequences have even higher priority than link management packets, so when clock tolerance compensation is implemented, clock tolerance compensation codes can be nested within link management packets.

Figure 7A:
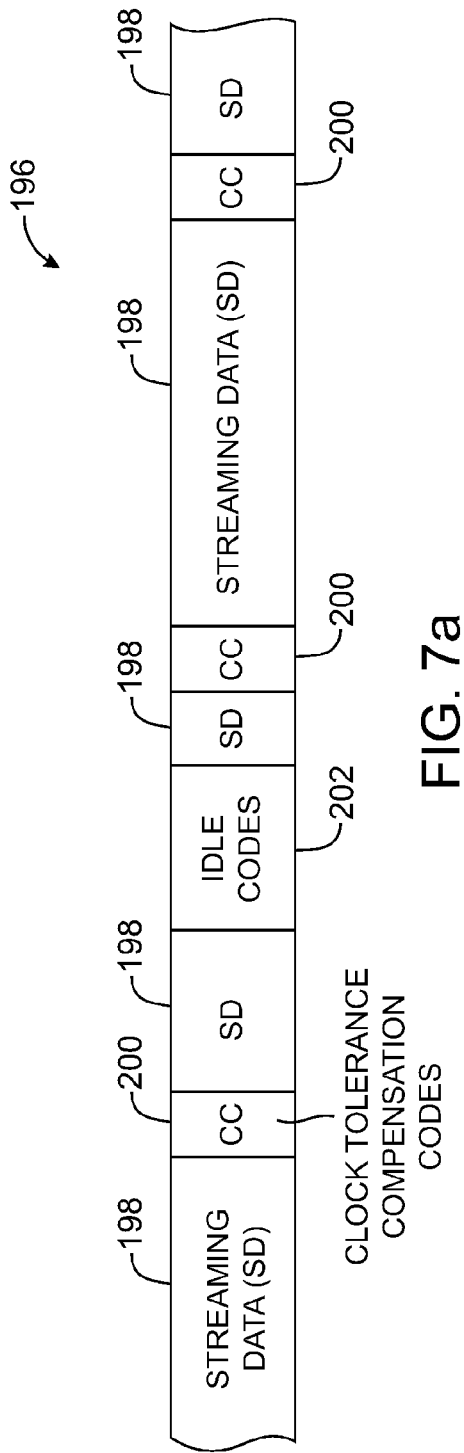
FIG. 7a is a diagram showing how serial communications circuitry with clock tolerance compensation capabilities may used to transmit streaming data in accordance with the present invention.
Figure 7B:
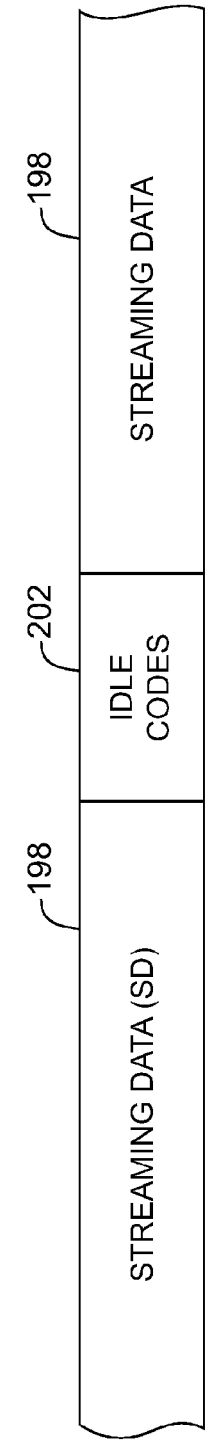
FIG. 7b is a diagram showing how serial communications circuitry without clock tolerance compensation capabilities may used to transmit streaming data without clock compensation codes in accordance with the present invention.

Computer aided design tools 62 may be used to provide a user with an opportunity to select desired data port and priority port features. When a user chooses to use a streaming data mode (which is available using the data port), the resulting circuit 110 will communicate over link 14 using streaming data of the type shown in FIGS. 7*a* and 7*b*. In the scenario of FIG. 7*a*, clock tolerance compensation capabilities have been implemented. In the scenario of FIG. 7*b*, clock tolerance compensation capabilities have not been implemented.

As shown in FIG. 7*a*, when the clock tolerance compensation feature has been implemented, a typical data stream 196 includes streaming data 198 intermixed with clock tolerance compensation codes 200 and idle codes 202. Idle codes 202 may be inserted when there is a gap in the data to be transmitted (i.e., data buffer 144 is empty) or when the local control circuitry 160 is temporarily pausing the transmission of data due to reception of a pause signal or other suitable flow control signal from the remote circuit. The streaming data mode may be used in environments in which the addition of the overhead associated with packet encapsulation is not desired.

When the clock tolerance compensation feature has not been implemented on a given circuit and the circuit is in streaming data mode, the circuit will produce a data stream of the type shown in FIG. 7*b*. As shown in FIG. 7*b*, the data stream 196 includes streaming data 198 intermixed with idle codes 202, but does not have clock tolerance compensation codes 200 (FIG. 7*a*). Idle codes 202 are preferably present in both data streaming modes—i.e., with and without clock tolerance compensation—because the use of idle codes is preferably mandatory.

Figure 8A:
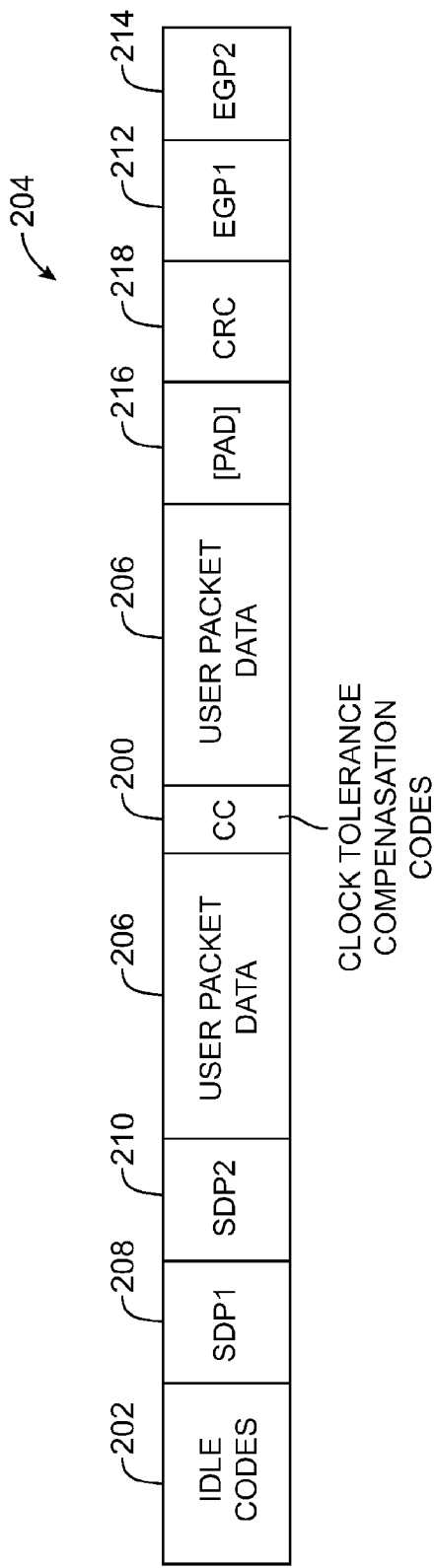
FIG. 8a is a diagram showing how serial communications circuitry with clock tolerance compensation capabilities may used to transmit packetized data in accordance with the present invention.
Figure 8B:
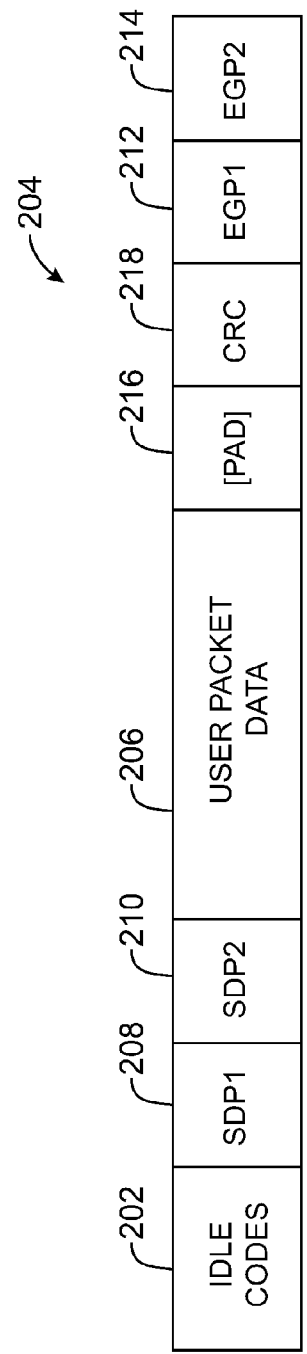
FIG. 8b is a diagram showing how serial communications circuitry without clock tolerance compensation capabilities may used to transmit packetized data without clock compensation codes in accordance with the present invention.

Data can also be transmitted in packets, as shown by data 204 in FIGS. 8*a* and 8*b*. Packetized data may be transmitted using either the data port or the priority port. In the example of FIGS. 8*a* and 8*b*, the transmitted packetized data 204 is being transmitted through the data port. With this type of arrangement, user data 206 from buffer 144 is encapsulated as a packet using data encapsulation circuit 152 (FIG. 6). During encapsulation of data 206 a pad character 216 is added to data 206 if data 206 has an odd length. Pad character 216 is not required when data 206 has an even length. If cyclic redundancy checking has been implemented, CRC redundancy information 218 may be added to the data by data encapsulation circuit 152 following pad 216. Start-of-packet (SOP) marker codes 208 and 210 and end-of-packet (EOP) marker codes 212 and 214 are placed at the beginning and end of the data 206 to form a completed packet. The packet 204 is then transmitted over link 14, where the SOP and EOP information is stripped, the pad byte is discarded, and error checking operations are performed using CRC information 218. As shown in FIG. 8*a*, when the clock tolerance compensation feature has been implemented, the packetized data includes clock tolerance compensation codes 200. When the clock tolerance compensation feature has not been implemented, no clock tolerance compensation codes are present, as shown in FIG. 8*b*. Whether or not clock tolerance compensation has been implemented, idle codes 202 are preferably inserted to fill gaps in the data, as shown in FIGS. 8*a* and 8*b*.

Figure 9:
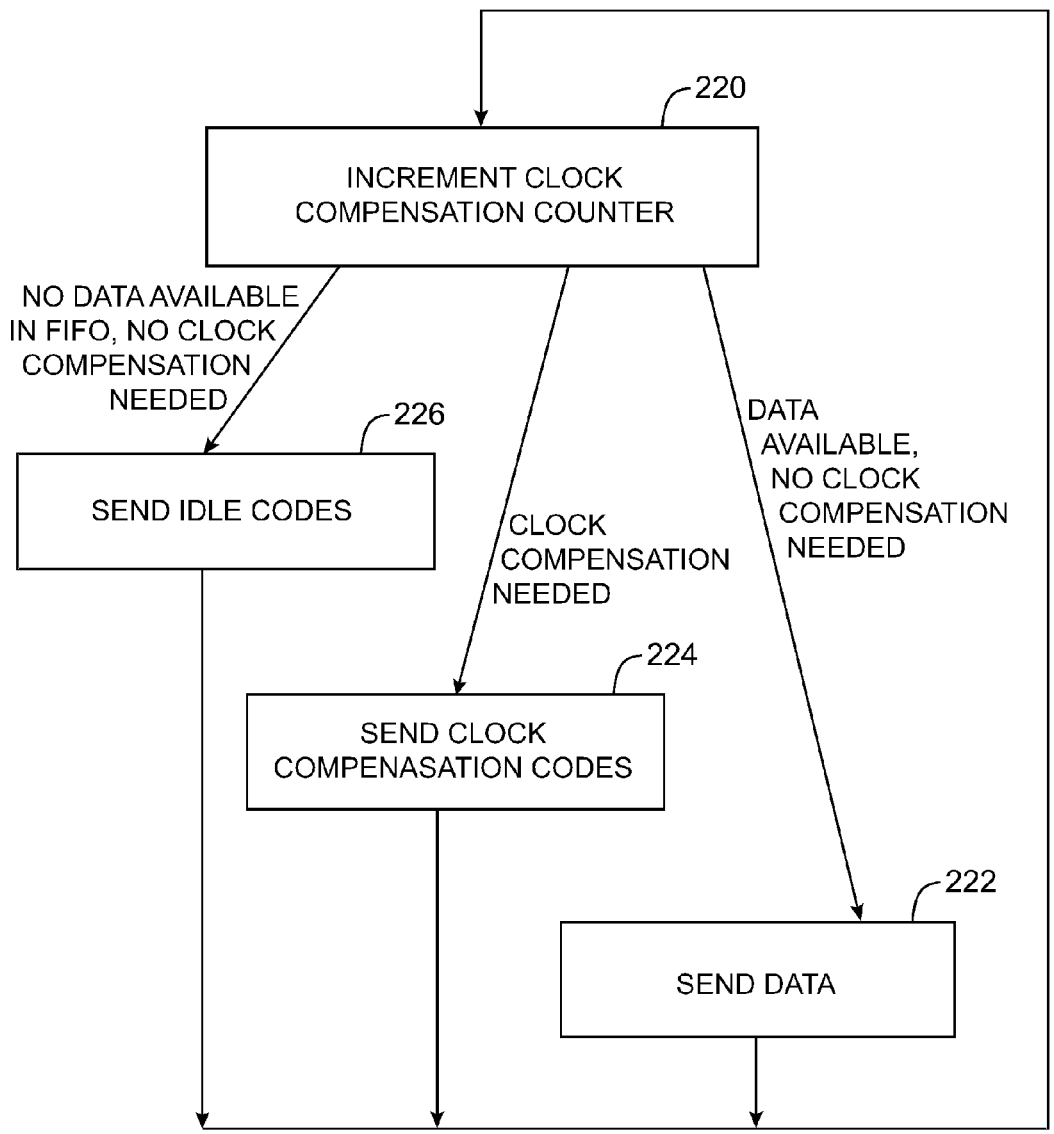
FIG. 9 is a flow chart of illustrative steps involved in transmitting streaming data over a serial communications link in accordance with the present invention.

Illustrative steps involved in transmitting data in streaming data mode are shown in FIG. 9. At step 220, the input/output circuitry 146 on circuit 110 increments a clock compensation counter (if clock tolerance compensation has been implemented). If data is available in data buffer 144 for transmission and no clock tolerance compensation characters are currently needed, the circuit can send the data to be transmitted over link 14 (step 222). The clock compensation counter can then be incremented again at step 220.

When it is time to insert a clock tolerance compensation code, clock compensation code generator 164 and data path multiplexer 154 may be used to insert clock compensation codes into the data stream (step 224). After clock compensation code insertion, the clock compensation counter can be incremented at step 220. Clock tolerance compensation codes take precedence over data. If the clock tolerance compensation feature has not been implemented on a given circuit, step 224 is omitted.

If no data is available in data buffer 144 to be transmitted and if the state of the clock compensation counter indicates that no clock compensation characters are currently needed, idle codes may be transmitted to maintain the link (step 226).

Figure 10:
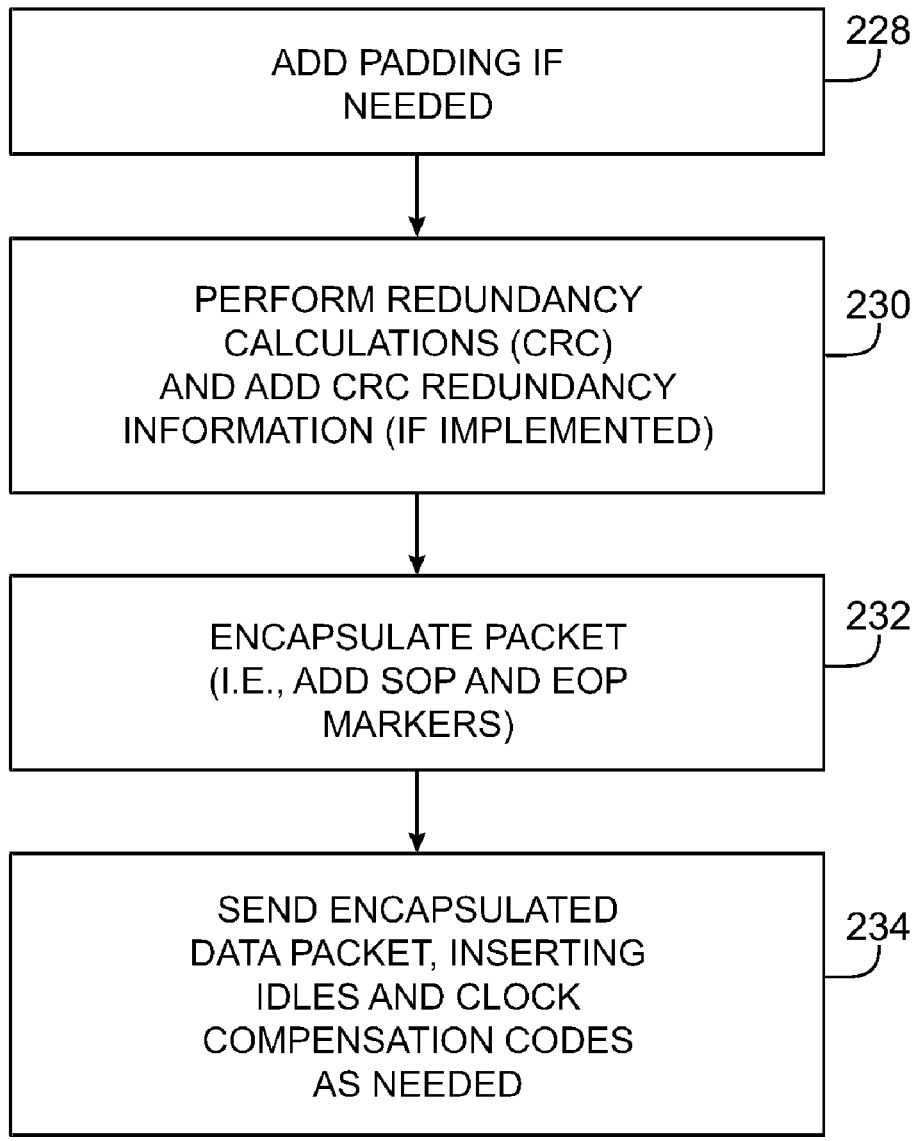
FIG. 10 is a flow chart of illustrative steps involved in transmitting packetized data over a serial communications link in accordance with the present invention.

When data is sent as packets, the steps of FIG. 10 can be used. Initially, padding is added (if needed) to make the user data 206 an even length of bytes long (step 228) (i.e., to maintain the word boundary). After padding, redundancy calculations are performed at step 230 (if data integrity protection has been implemented). For example, if the user chose to implement data integrity protection using a CRC-16 (16-bit) scheme, 16 bits of CRC redundancy information may be calculated from data 206. If the user chose to implement the more robust CRC-32 (32-bit) scheme, 32 bits of redundancy information may be created. No redundancy information is generated if the user chose not to implement data integrity protection. The redundancy information may be added to the data 206 following the optional pad byte.

At step 232, the data 206 may be encapsulated as a packet using SOP and EOP markers. Data being transmitted using the data port is provided with the SOP marker characters SDP1 and SDP2 and the EOP marker characters EGP1 and EGP2, as shown in FIGS. 8*a* and 8*b*. Data being transmitted using the priority port is provided with the SOP marker characters SPP1 and SPP2 and the EOP marker characters EGP1 and EGP2.

Following data encapsulation, the encapsulated data packet may be transmitted from the local integrated circuit to the remote integrated circuit (step 234). Idle characters and clock compensation codes may be inserted as needed.

Data packets sent using the data port are sent using a "cut-through" data flow method. With this approach, packet data is transmitted as soon as sufficient data is available, without waiting for an entire packet to be available to transmitter circuitry 114. The cut-through approach provides low latency for the data path and can be used where latency delays are undesirable. Priority packets may be delivered using a "store-and-forward" data flow method. With the store-and-forward approach, no packet data is transmitted until the entire packet has been provided to the transmitter circuitry 114. Because priority packet data must be received into data buffer 144 before it can be transmitted, the size of data buffer 144 determines the upper limit on the allowable size of a priority packet. There is no limit to the allowed length of regular data packets, which can be particularly beneficial in applications such as medical image processing in which it is often necessary to transport large packets in a burst.

Figure 11:
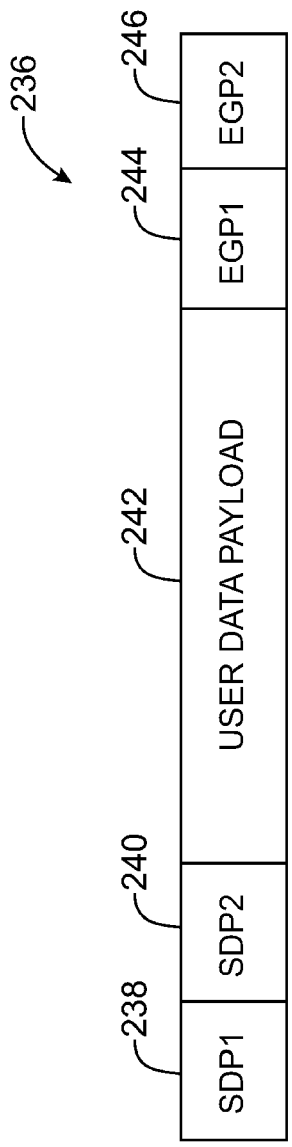
FIG. 11 is a data diagram showing a typical user data packet constructed in accordance with the present invention.

Data transmitted using the priority port will take precedence over data being transmitted using the data port. As a result, priority data packets will be nested within regular data packets when regular and priority data is available for transmission at the same time. A regular data packet 236 is shown in FIG. 11. Packet 236 has a data payload 242 encapsulated between SOP markers 238 and 240 and EOP markers 244 and 246. When it is desired to transmit priority data over link 14 (e.g., data that is needed to control an important system function), the user can send that data to the priority port.

Figure 12:
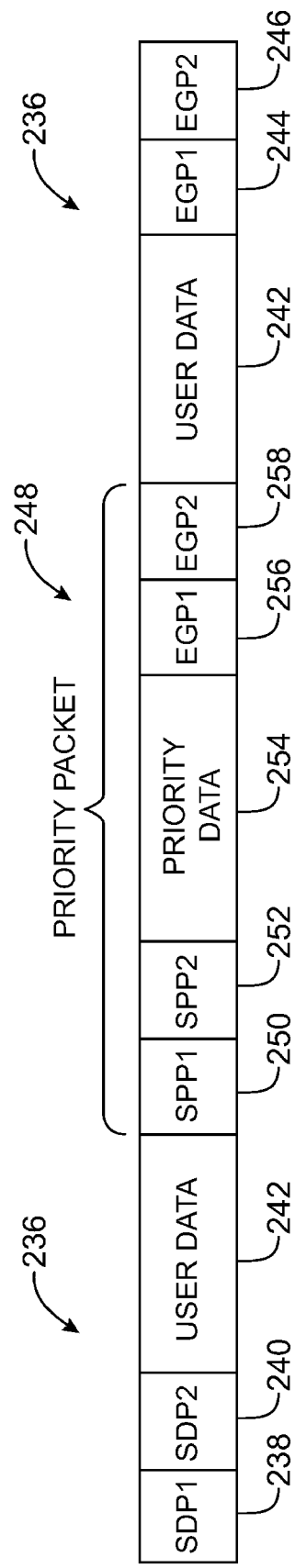
FIG. 12 is a data diagram showing how a priority packet may be nested within a regular data packet in accordance with the present invention.

Priority data is encapsulated in a packet and is transmitted over the link 14. Because priority data takes precedence over regular data, the normal transmission of the regular data packet is temporarily interrupted by the transmission of the priority data packet. This results in the priority data packet 248 becoming nested within the regular data packet 236, as shown in FIG. 12. As shown in FIG. 12, the priority data packet includes a priority data payload 254 (the length of which the protocol may restrict to limit the required size for the user packet buffer 144) that has been encapsulated between priority data packet SOP characters 250 and 252 and priority data packet EOP marker characters 256 and 258. The packet 248 breaks the regular data packet data payload 242 into two portions. (Idle characters and clock tolerance compensation characters may also be inserted in the packets of FIGS. 11 and 12 as needed, but these characters are not shown in FIGS. 11 and 12 for clarity.)

Figure 13:
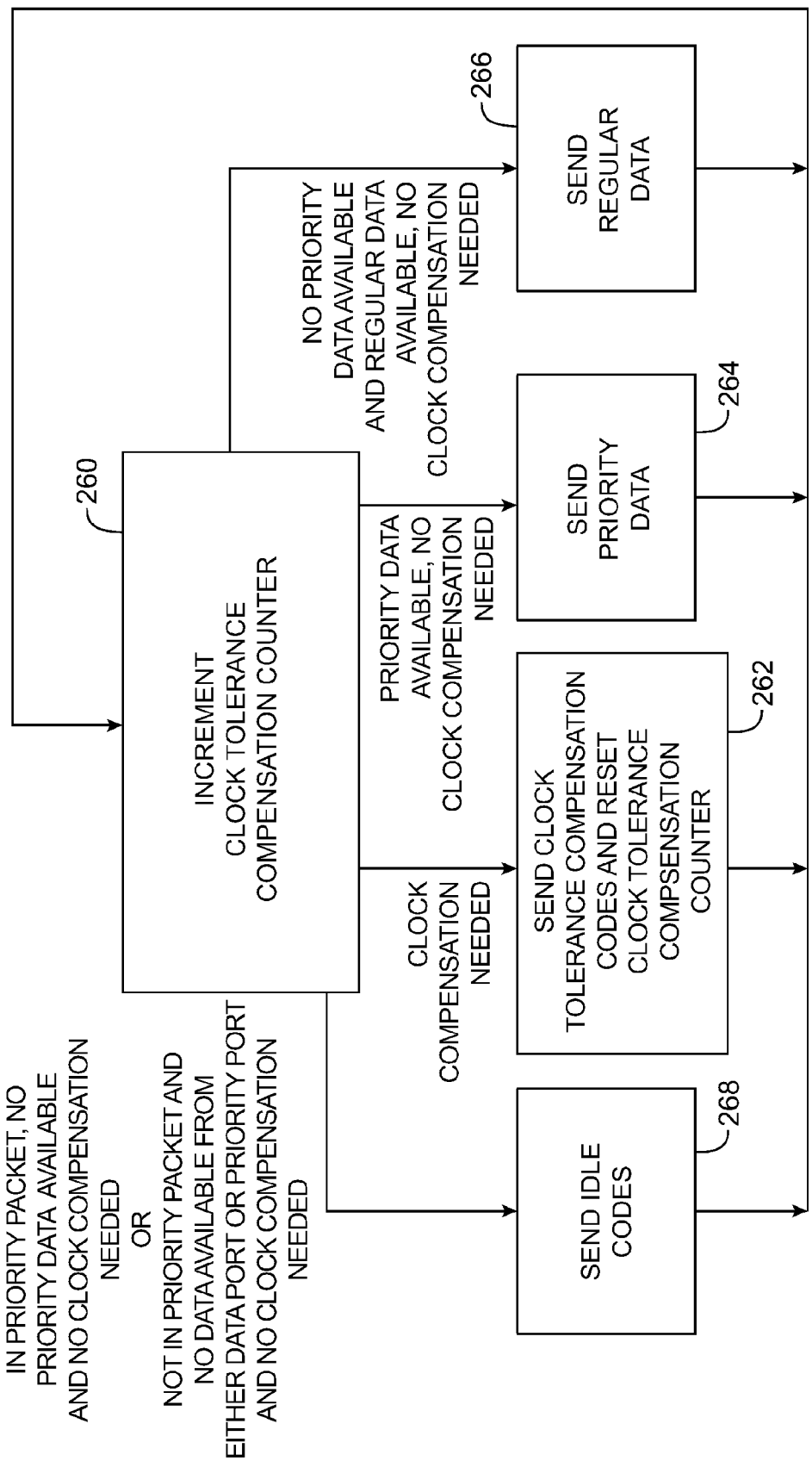
FIG. 13 is a flow chart of illustrative steps involved in transmitting regular and priority data in an integrated circuit in which both a regular data and a priority data port have been implemented in accordance with the present invention.

A flow chart of illustrative steps involved in transmitting data over link 14 when both a data port and priority port have been implemented in circuit 110 are shown in FIG. 13. At step 260 a clock tolerance compensation counter may be incremented (if clock tolerance compensation circuitry has been implemented on circuit 110).

If the counter reaches a limit value that indicates that a clock tolerance compensation character is needed, clock tolerance compensation codes from clock compensation code generator 164 are inserted into the data using data path multiplexer 154 (step 262). The clock tolerance compensation counter is then reset and control loops back to step 260.

If priority data is available and no clock compensation codes are currently required, the priority data is sent over link 14 from the priority data buffer circuitry in data buffer 144 (step 264). Data encapsulation circuit 152 encapsulates the priority data by adding the priority data packet SOP and EOP markers. Data path multiplexer 154 directs the priority data path data into the data path. After the priority data has been sent, the circuit returns to step 260.

If regular data is available for transmission and if no priority data is available and no clock compensation codes are needed, the regular data may be sent at step 266. The regular data is encapsulated using data encapsulation circuit 152. The control circuitry 160 directs data path multiplexer 154 to merge the regular data from data encapsulation circuit 152 into the data path so that the regular data is transmitted over link 14.

If there is a gap in the data to be transmitted, idle codes may be inserted into the data path. In particular, idle codes may be inserted into the data path at step 268, provided that the circuit (1) is in a priority packet with no currently available priority data to send and no clock tolerance compensation codes being currently required or (2) is not in a priority packet and no data is available for transmission from either the data port or the priority port and no clock tolerance compensation codes are currently required.

When both the regular data port and priority data port are used, as in the process of FIG. 13, regular data transmission may be made using the data port. System messages or any other priority information may be sent through the priority port, which interrupts the regular data.

Figure 14A:
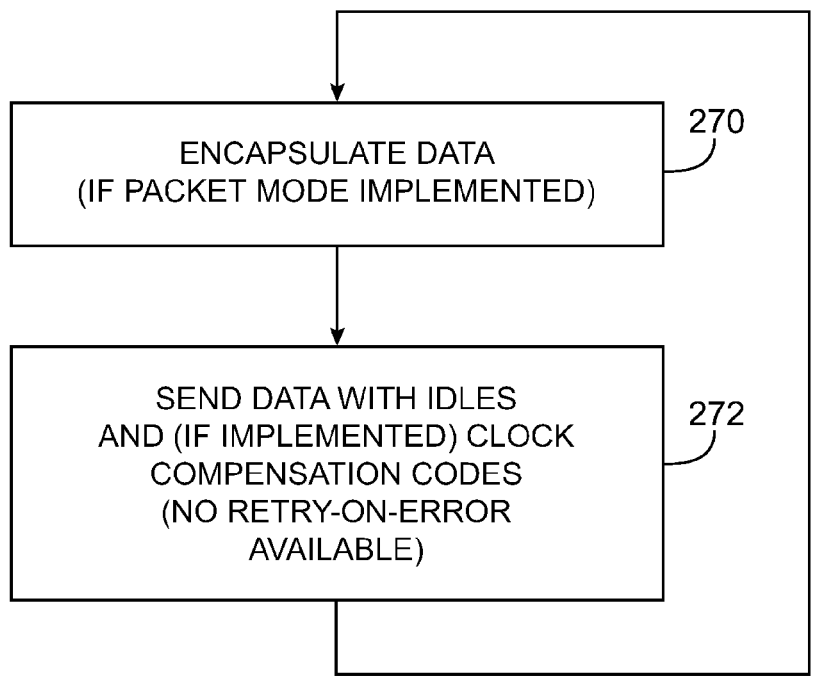
FIG. 14a is a flow chart of illustrative steps involved in transmitting packetized data in an integrated circuit in which a regular data port has been implemented, but no priority port has been implemented in accordance with the present invention.

The user may chose to only implement a data port in circuit 110. In this situation, the circuit transmits regular data using the process of FIG. 14a. If the "packetized" data mode has been selected, the regular data to be transmitted is first encapsulated at step 270. If the "streaming" data mode has been selected, encapsulation is not performed. At step 272, the regular data is transmitted over link 14. In particular, control circuitry 160 controls multiplexer 154 to ensure that clock tolerance compensation codes (if clock tolerance compensation has been implemented) and idle codes are inserted at appropriate times.

Retry-on-error functionality requires a store-and-forward arrangement using a circular buffer. This circular buffer is not implemented in circuit 110 when only a regular data port is implemented. Accordingly, retry-on-error functionality cannot be provided using the arrangement of FIG. 14a. Because data is transmitted using a cut-through approach rather than a store-and-forward approach, latency is reduced. The approach of FIG. 14a may therefore be desired when low latency is an important design consideration. Moreover, because no circular buffer is used, data packets may be extremely large (essentially unlimited size). Without the need to support retry-on-error operations, the bits in the SOP markers that would otherwise be used for packet numbering may be put to other uses (e.g., to expand the number of user-labeled data channels a user may implement).

Figure 14B:
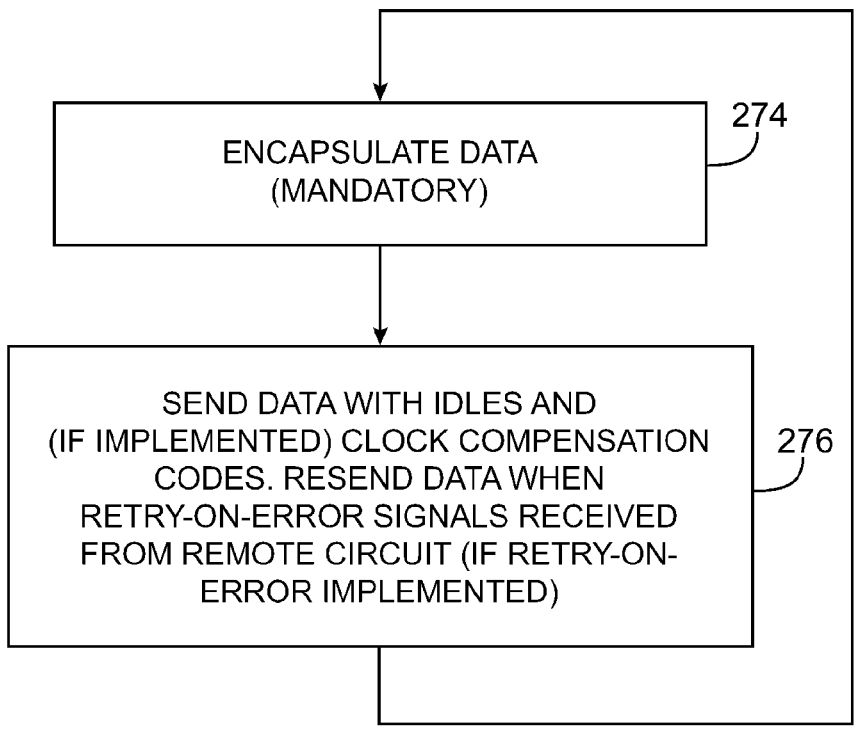
FIG. 14b is a flow chart of illustrative steps involved in transmitting packetized data in an integrated circuit in which a priority data port has been implemented, but no regular data port has been implemented in accordance with the present invention.

If the user opts to implement only a priority port in circuit 110, data may be transmitted over link 14 using the process of FIG. 14b. All priority port data is packetized, so at step 274 a mandatory data encapsulation step is performed to encapsulate the priority data in a packet. At step 276, the priority packet is transmitted over link 14. During step 276, the circuit inserts idle characters and (if implemented) clock tolerance compensation codes.

If selected by the user, retry-on-error functions can be used at step 276 to help ensure successful transmission of data over the link. When retry-on-error capabilities are provided, packets are labeled with packet numbers by circuit 110. The packet number information is provided within the priority packet SOP markers, so less of the marker capacity is available for implementing additional features (such as for implementing user-defined channel multiplexing schemes) than would be available if the retry-on-error capabilities were not used. However, the retry-on-error scheme provides a more robust link that is less prone to disruption by errors than schemes without retry-on-error.

Priority data is transmitted through a circular buffer in data buffer 144 using a store-and-forward arrangement. The use of the store-and-forward arrangement allows retry-on-error functions to be implemented, but adds a degree of latency to the transmission process. The circular buffer also imposes a maximum packet size limitation on priority data, because data must be stored in the circular buffer before it is sent. The use of the circular buffer and the store-and-forward data transmission arrangement prevents the priority data port from being used to handle streaming data. If a user desires to stream data over link 14, the regular data port may be used.

Three different levels of data integrity protection are available: (1) no protection, (2) CRC-16, and (3) CRC-32. These are illustrative levels of data integrity protection that may be implemented using the serial communications protocol of the invention. Other suitable arrangements may use fewer levels of protection, may use more levels of protection, or may be implemented using a different type of redundancy algorithm.

Figure 15:
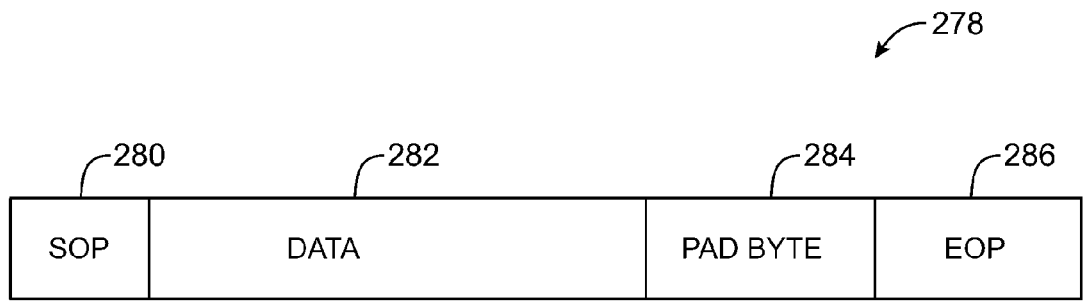
FIG. 15 is a data diagram showing the appearance of a data packet when data integrity protection has not been implemented on an integrated circuit in accordance with the present invention.

An illustrative data packet 278 that may be transmitted by circuit 110 when no data integrity protection has been implemented is shown in FIG. 15. The data payload 282 and optional pad byte 284 are encapsulated between SOP markers 280 and EOP markers 286. There is no redundancy information for performing error checking associated with packet 278. Because no data integrity protection capabilities are required, the circuitry for performing cyclic redundancy checking operations or other suitable data error checking functions may be omitted from the receiver circuitry 116, thereby reducing the amount of resources consumed by integrated circuit 110.

Figure 16:
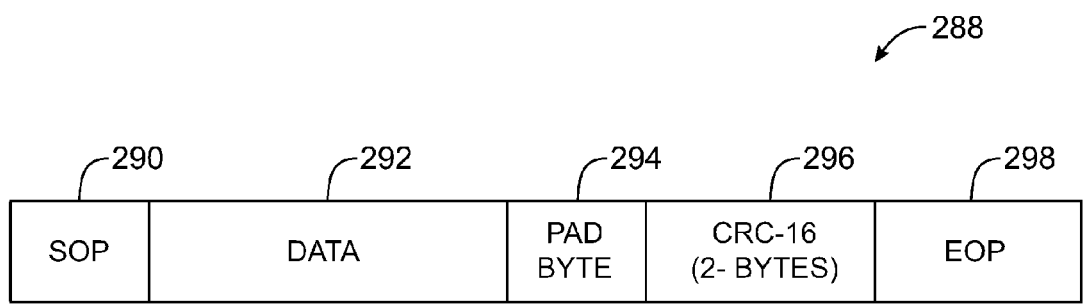
FIG. 16 is a data diagram showing the appearance of a data packet when a 16-bit cyclic redundancy check (CRC-16) data integrity protection scheme has been implemented on an integrated circuit in accordance with the present invention.

An illustrative data packet 288 when a first level of data integrity protection has been implemented is shown in FIG. 16. In the example of FIG. 16, data integrity protection is provided using a 16-bit cyclic redundancy check (CRC-16) arrangement. CRC operations are performed on the data before it is transmitted to produce CRC-16 data 296, which contains compressed information on the data 292. The redundancy data 296 may be encapsulated between the SOP and EOP markers 290 and 298 before encapsulation with the data payload 292 and optional pad byte 294. After the data packet 288 has been transmitted over link 14, the redundancy information 296 and contents of data payload 292 can be compared using data error checking circuitry 190 (FIG. 6) to determine whether the transmission of the data packet 288 over link 14 has introduced any errors.

Figure 17:
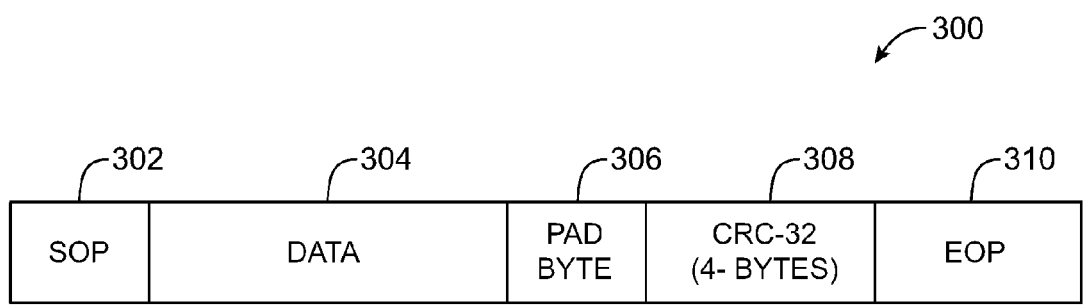
FIG. 17 is a data diagram showing the appearance of a data packet when a 32-bit cyclic redundancy check (CRC-32) data integrity protection scheme has been implemented on an integrated circuit in accordance with the present invention.

A stronger form of CRC redundancy may be provided using a 32-bit CRC arrangement. With this type of arrangement, 32-bits of CRC redundancy information 308 are provided in packet 300, as shown in FIG. 17. The CRC redundancy information 308, data payload 304, and optional pad byte 306 are encapsulated between SOP and EOP markers 302 and 310 before transmission of the packet 300 over link 14.

Figure 18:
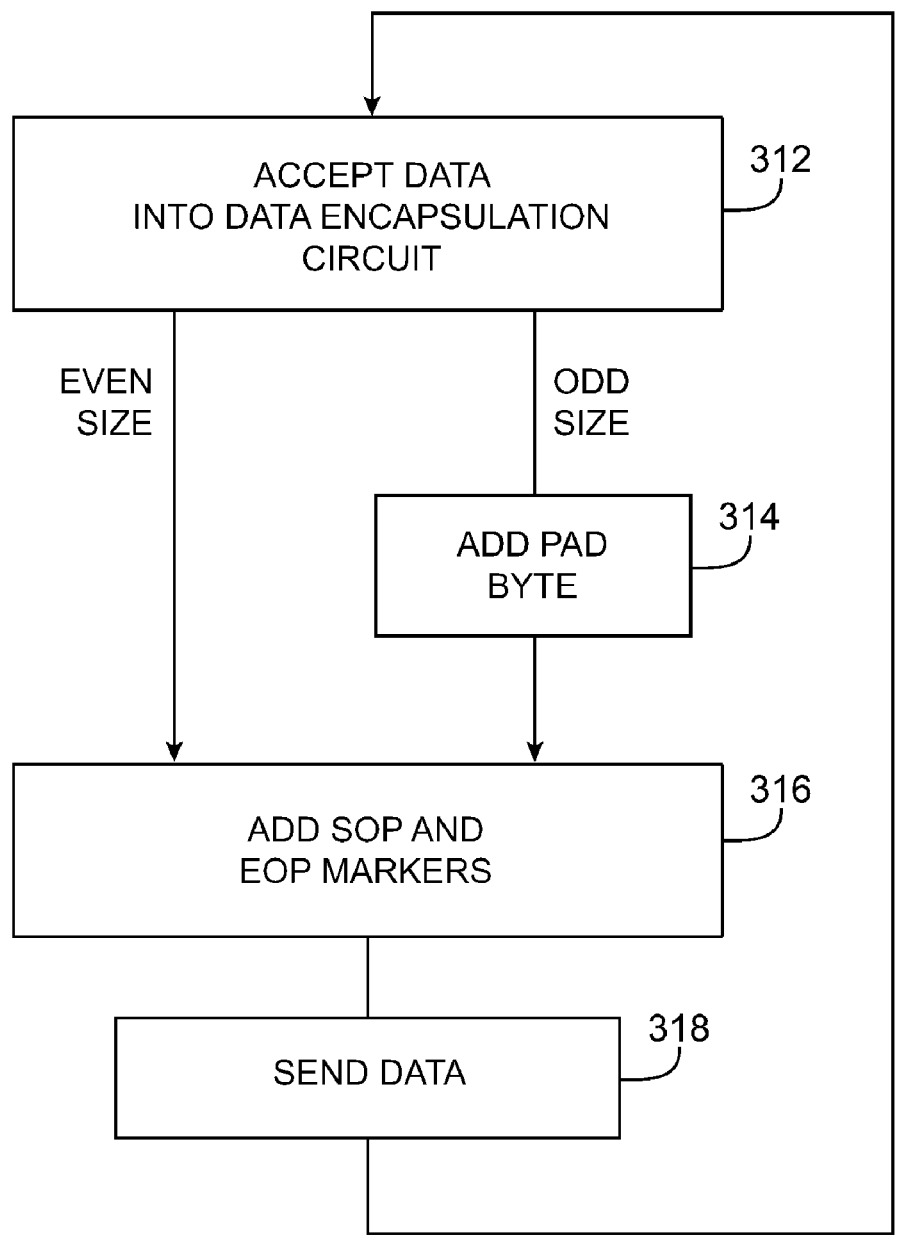
FIG. 18 is a flow chart of illustrative steps involved in transmitting data from an integrated circuit in which data integrity protection has not been implemented in accordance with the present invention.

The flow chart of FIG. 18 shows illustrative steps involved in transmitting data packets when no data integrity protection has been implemented. At step 312, the data to be transmitted that has been accepted into data buffer 144 from logic 112 is passed from data buffer 144 to data encapsulation circuit 152. If the length of the data has an odd number of bytes, a pad byte may be added at step 314. At step 316, the SOP and EOP markers are added to the beginning and end of the data payload by encapsulation circuit 152 to form a packet. The packet is transmitted to the remote integrated circuit at step 318. Idle codes and clock compensation codes can be inserted if needed.

Figure 19:
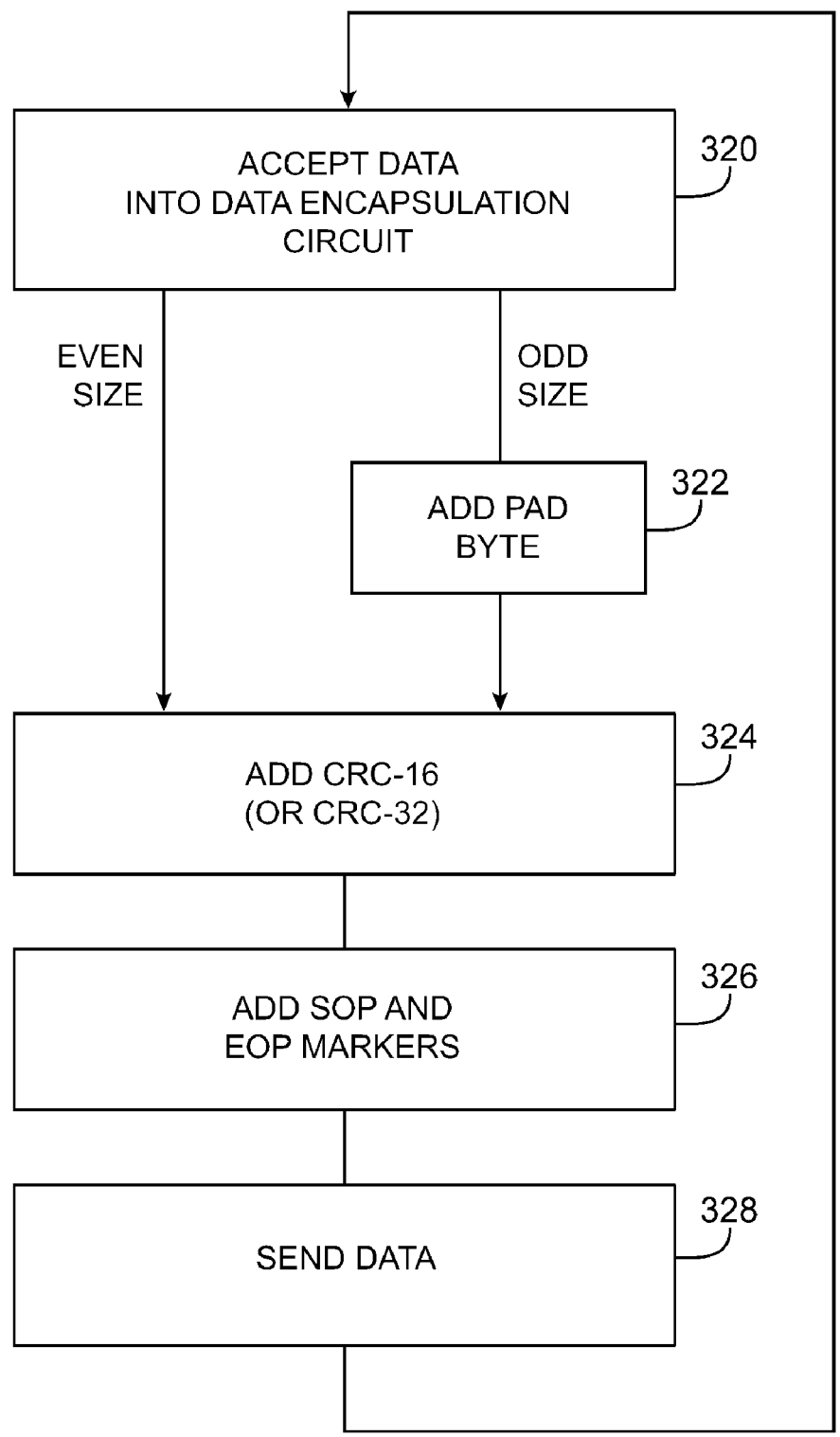
FIG. 19 is a flow chart of illustrative steps involved in transmitting data from an integrated circuit in which data integrity protection based on a CRC-16 or CRC-32 redundancy scheme has been implemented in accordance with the present invention.

If the user chose to implement either the CRC-16 or CRC-32 scheme, the data transmission process is different, as shown in FIG. 19. At step 320, data is accepted into data encapsulation circuit 152 (FIG. 6). If the data has an odd number of bytes, a pad byte may be added to the payload at step 322. At step 324, the CRC information is calculated and added to the payload and optional pad byte. If a CRC-16 scheme is being used, 16 bits of CRC information are added, as shown in FIG. 16. If a CRC-32 scheme is being used, 32 bits of CRC redundancy information are added, as shown in FIG. 17. The CRC may cover all characters in the data from the second field in the SOP sequence through the pad character (if used). At step 326 of FIG. 19, the data encapsulation circuit 152 adds SOP and EOP markers to the data packet. The data packet may then be transmitted over link 14 (step 328), with idle codes and clock compensation codes added if needed. Because the user can select between different levels of data integrity protection, the data integrity protection capabilities of the circuit can be optimized based on considerations such as packet size and desired application.

At the remote integrated circuit, receiver circuitry 116 is used to receive the transmitted data packets. If error correction has been implemented, the CRC-16 or CRC-32 information may be used to help determine whether there has been an error in the transmission of the data over link 14.

Figure 20:
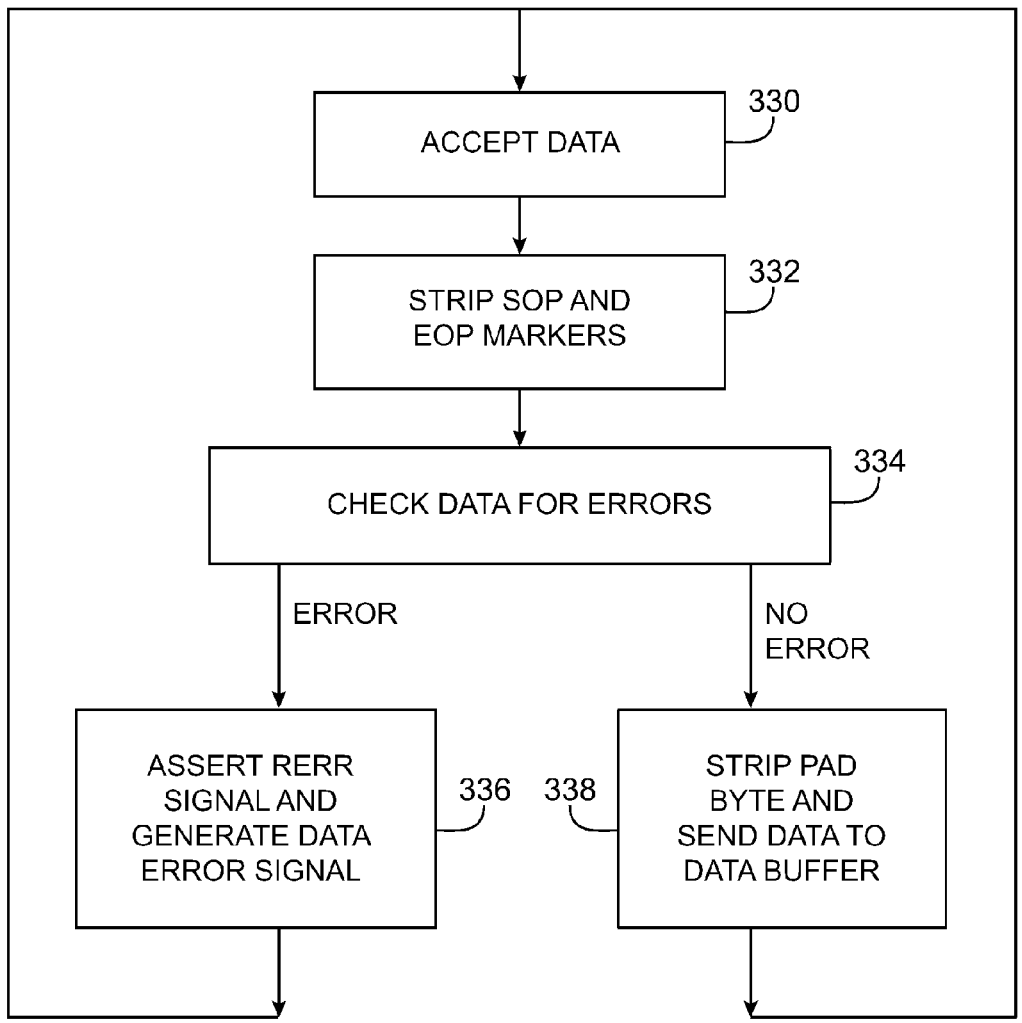
FIG. 20 is a flow chart of illustrative steps involved in receiving data into an integrated circuit in which a regular data port has been implemented in accordance with the present invention.

Illustrative steps involved in receiving regular (non-priority) data transmitted from a regular data port on a local circuit to a regular data port on a remote circuit are shown in FIG. 20. At step 330, data is accepted into the receiver 116. At step 332, the SOP and EOP markers are stripped from the incoming packet using lane stripping and packet processing circuitry 186. If the CRC-16 or CRC-32 redundancy information is present, that information can be used by data error checking circuitry 190 to determine whether the transmitted data payload has an error (step 334). If the received regular data payload is determined to have an error at step 336, an RERR signal is asserted on ERR port 192 and a data error signal is generated on error status port 194. This alerts logic 112 that a data error on the regular data port error has been detected. If the received regular data payload is determined not to contain any errors, the pad byte may be stripped (if it was present) and the received data may be passed to the regular data port buffer circuitry in data buffer 176 (step 338).

Figure 21:
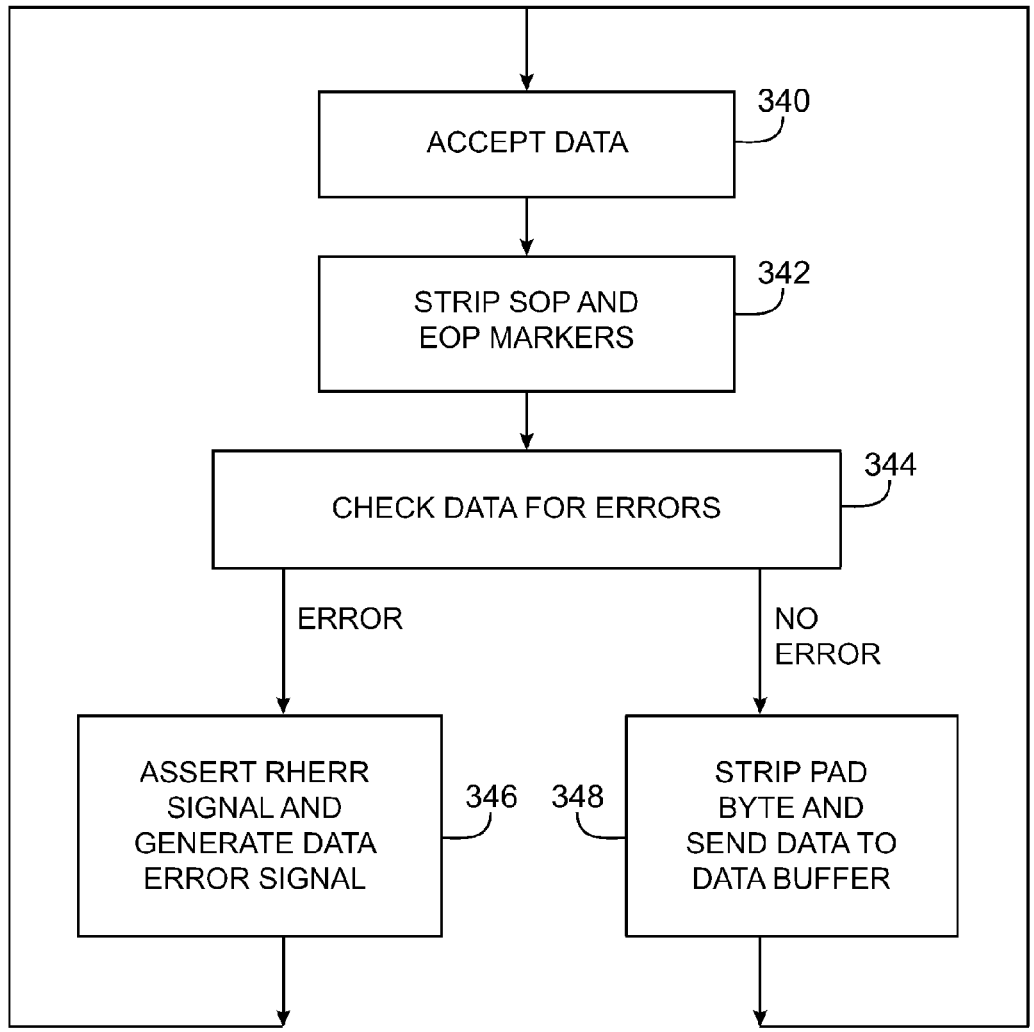
FIG. 21 is a flow chart of illustrative steps involved in receiving data into an integrated circuit in which a priority data port without retry-on-error capabilities has been implemented in accordance with the present invention.

Illustrative steps involved in receiving priority data packets transmitted from a priority data port on a local circuit to a priority data port on a remote circuit when the retry-on-error function has not been implemented are shown in FIG. 21. At step 340, data is accepted into the receiver 116. The SOP and EOP markers are stripped from the incoming packet using lane stripping and packet processing circuitry 186 (step 342). If CRC-16 or CRC-32 redundancy information is present, it can be used by data error checking circuitry 190 to check whether the transmitted data payload has an error (step 344). If the received priority data payload is determined to have an error at step 346, an RHERR signal is asserted on ERR port 192 and a data error signal is generated on error status port 194. This alerts logic 112 that a data error on the priority data port has been detected. If the received priority data payload is determined not to contain any errors, the pad byte may be stripped (if it was present) and the received data may be passed to the priority data port buffer circuitry in data buffer 176 (step 348).

Figure 22:
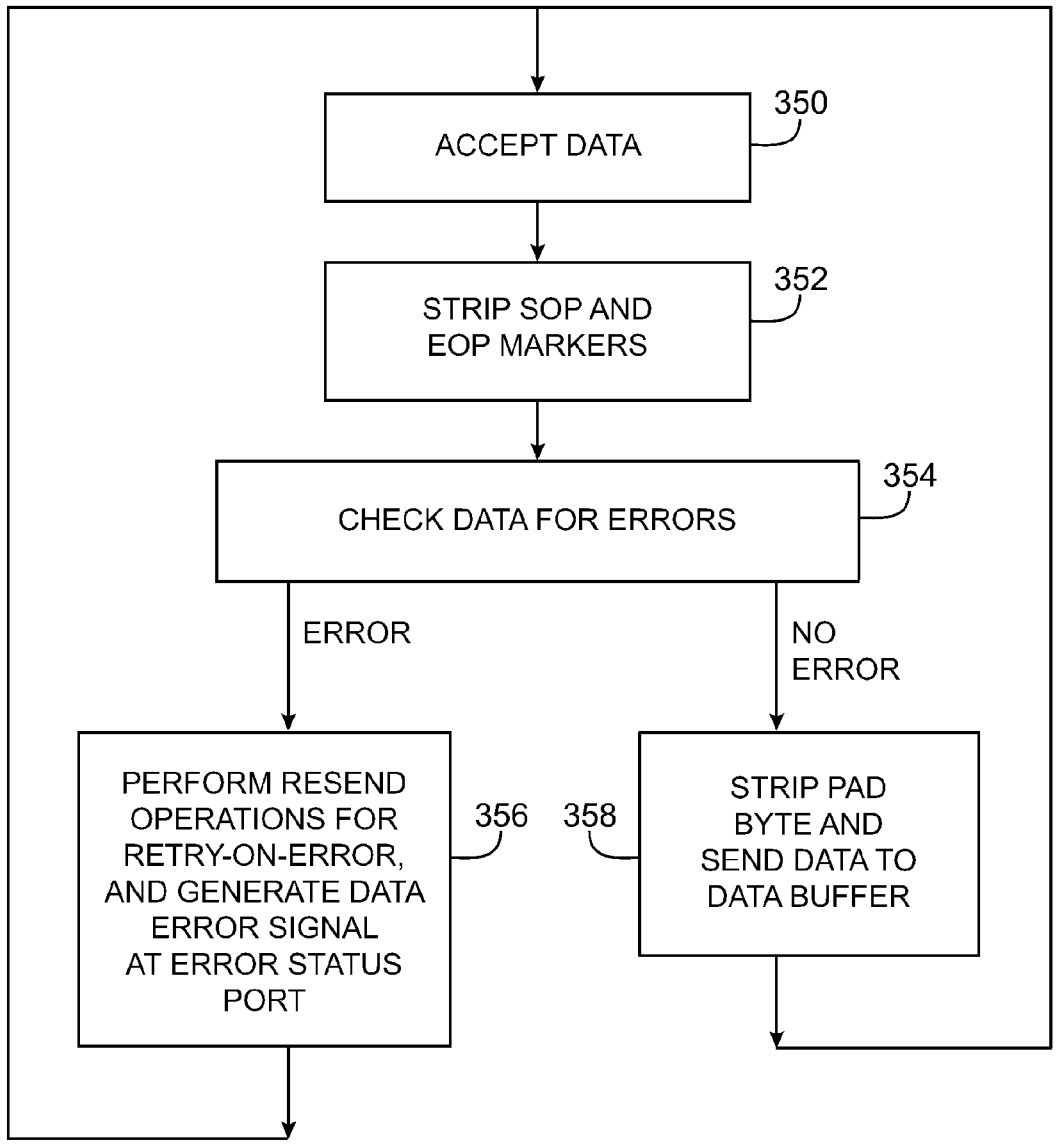
FIG. 22 is a flow chart of illustrative steps involved in receiving data into an integrated circuit in which a priority data port with retry-on-error capabilities has been implemented in accordance with the present invention.

Illustrative steps involved in receiving priority data packets transmitted from a priority data port on a local circuit to a priority data port on a remote circuit when the retry-on-error function has been implemented are shown in FIG. 22. At step 350, data is accepted into the receiver circuitry 116 of the remote circuit. The SOP and EOP markers are stripped from the incoming packet using lane stripping and packet processing circuitry 186 (step 352). If CRC-16 or CRC-32 redundancy information is present, it can be used by data error checking circuitry 190 to check whether the transmitted data payload has an error (step 354). If the received priority data payload is determined to have an error, retry-on-error resend operations may be performed and data error signals may be generated at step 356. Performing the retry-on-error operations provides the transmitting circuit with another opportunity to transmit the data without errors. If the received priority data payload is determined not to contain any errors, the pad byte may be stripped (if it was present) and the received data may be passed to the priority data port buffer circuitry in data buffer 176 (step 358).

The serial communications protocol of the invention allows users to selectively implement an optional data channel multiplexing feature. With this feature, the user may define multiple "channels" in link 14. Each channel serves as an independent bus and may be used to transmit a different type of data across link 14. For example, a user may send system messages across the link using one or more of the user-defined data channels. This type of capability may be particularly advantageous in arrangements in which there is only a priority port available and no regular data port (e.g., because the user is using the priority port for its retry-on-error capabilities). A given data packet must belong exclusively to a single channel, but other packets can belong to different channels. The number of channels used bears no relation to the number of lanes 16 in link 14. For example, multiple user-defined data channels may be used in links 14 that contain only a single lane.

A channel number is associated with each user-defined channel. At the local integrated circuit, the channel number may be embedded into the SOP marker information associated with each packet. Up to 256 independent data channels may be defined by the user when the regular data port is used. When the priority port is used, some of the SOP marker information is used for labeling packet numbers for retry-on-error operations. Less room is therefore available in the SOP fields of priority packets for use in channel numbering. As a result, when the priority port is used, up to 16 independent data channels may be defined.

Figure 23:
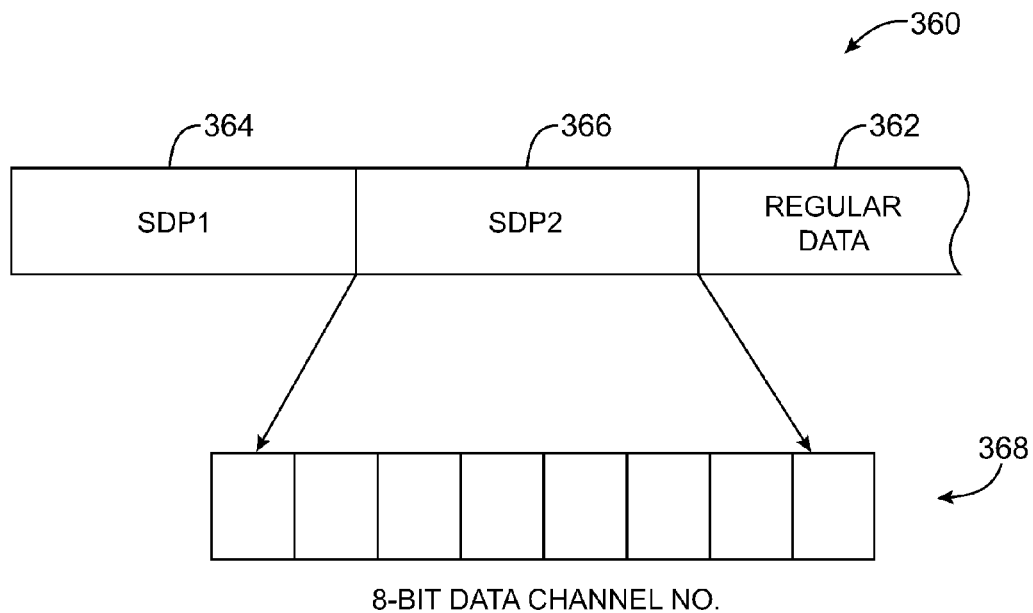
FIG. 23 is a diagram showing how the SDP2 field in a start-of-packet (SOP) marker in a regular data packet can contain a user-defined 8-bit data channel number for use in data channel multiplexing arrangements in accordance with the present invention.

The SOP marker information that accompanies regular data packets when user-defined data channel multiplexing is used is shown in FIG. 23. The portion of the packet 360 shown in FIG. 23 has a regular data payload 362 to which SOP information has been added by data encapsulation circuit 152. The SOP information includes two characters—an SDP1 character 364 and an SDP2 character 366. Each character contains 8 bits. As shown in the detail at 368, the 8-bits of the SDP2 field may be used as an 8-bit channel number when a user desires to implement data channel multiplexing in circuit 110. The 8 bits of field 366 allow up to 256 channels to be defined for the regular data port.

Figure 24:
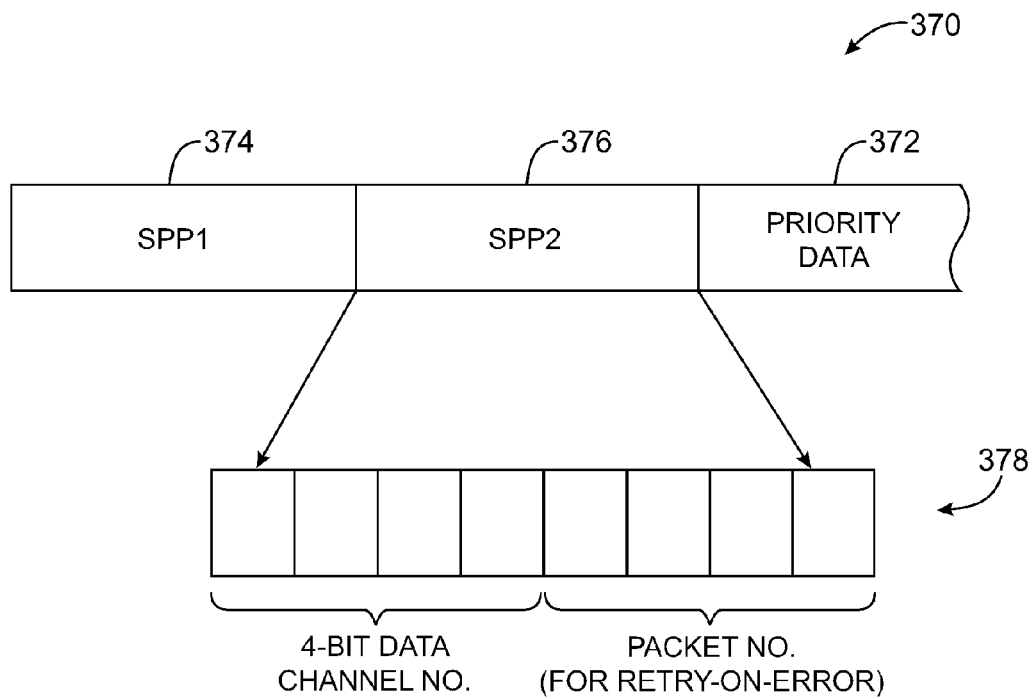
FIG. 24 is a diagram showing how one four-bit portion of a SPP2 field in a start-of-packet (SOP) marker in a priority data packet can contain a user-defined 4-bit data channel number for use in data channel multiplexing arrangements in accordance with the present invention.

The SOP marker information that accompanies priority data packets when user-defined data channel multiplexing is used is shown in FIG. 24. The portion of the packet 370 shown in FIG. 24 has a priority data payload 372 to which SOP information has been added by data encapsulation circuit 152. The SOP information includes two characters—an SPP1 character 374 and an SPP2 character 376. Each character contains eight bits. As shown in the detail at 378, four of the eight bits of the SPP2 character is used to label the packet with a packet number. The packet number is used to label each packet for retry-on-error operations. The remaining four of the eight bits are used for the user-defined channel number for data channel multiplexing. The four channel number bits in the SPP2 field allow up to 16 user-defined data channels to be defined for the priority data port.

Figure 25:
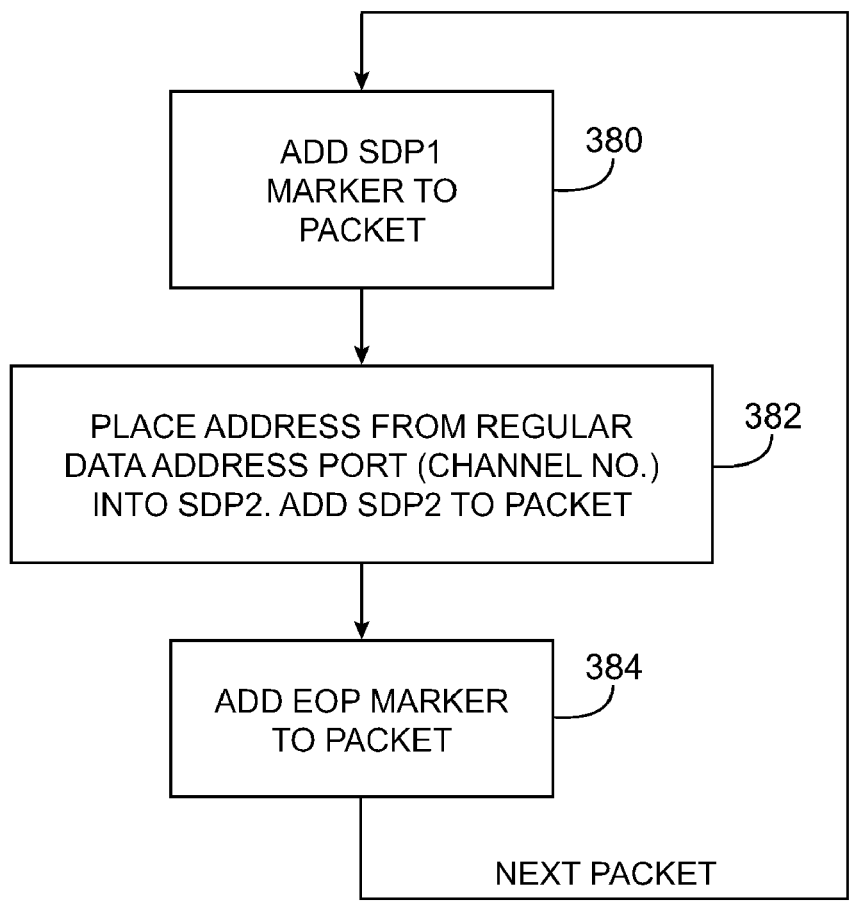
FIG. 25 is a flow chart of illustrative steps involved in embedding data channel information in a packet for a data channel multiplexing arrangement in an integrated circuit in which a regular data port has been implemented in accordance with the present invention.

Illustrative steps involved in using data channel numbers when encapsulating regular data in data encapsulation circuit 152 are shown in FIG. 25. At step 380, the SDP1 marker is added to the regular data payload. At step 382, the address from the regular data address port is placed into the SDP2 character and the SDP2 character is added to the packet, thereby completing the SOP information. The logic 112 generates signals on this address port that define the desired data channel number for the packet. If, for example, it is desired to send data on user-defined data channel No. 2, the address port signal 00000010 can be placed on the regular data address port. The data encapsulation circuit takes the data channel number information from the regular data address port and incorporates this information in the SDP2 information being used to encapsulate the regular data packet payload. At step 384, the EOP marker is added to the packet. The process then loops back to step 380, so that additional regular data packets can be processed.

Figure 26:
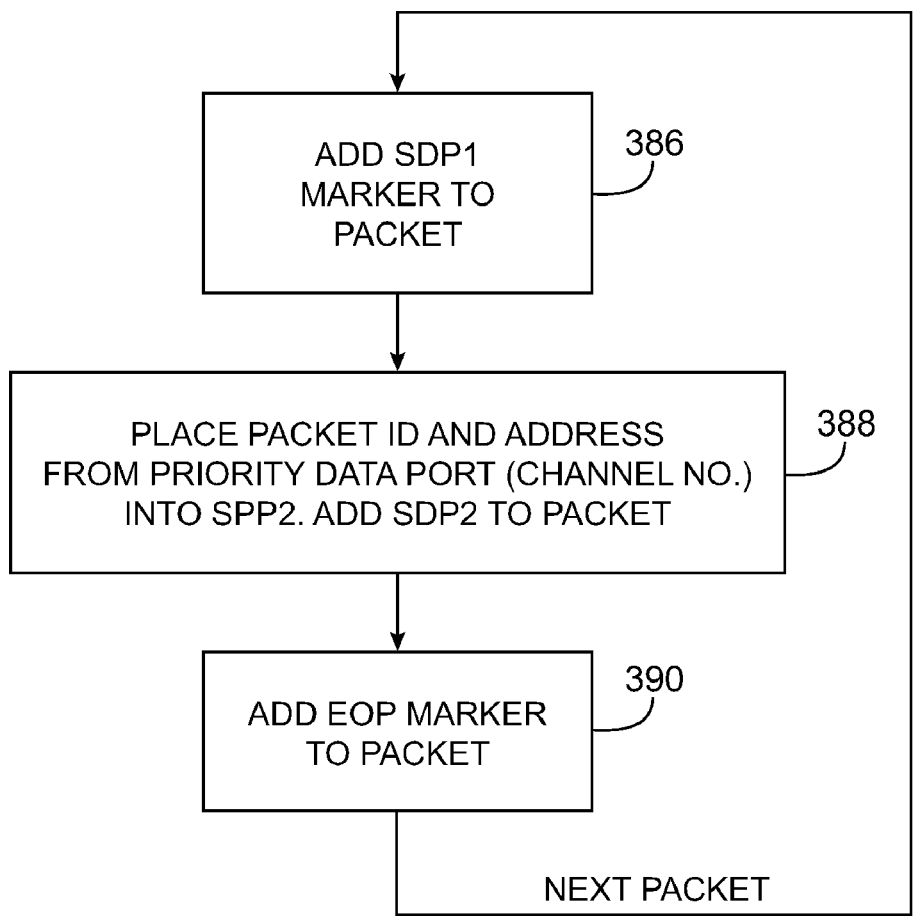
FIG. 26 is a flow chart of illustrative steps involved in embedding data channel information in a packet for a data channel multiplexing arrangement in an integrated circuit in which a priority data port has been implemented in accordance with the present invention.

Illustrative steps involved in using data channel numbers when encapsulating priority data in data encapsulation circuit 152 are shown in FIG. 26. At step 386, the SPP1 marker is added to the priority data payload. At step 388, SPP2 character is created and is added to the packet. When creating the SPP2 character, the packet identifier (i.e., the packet number) is used for the first four bits and the address from the priority data address port is placed into the second four bits. The logic 112 generates signals on this address port that define the desired data channel number for the packet. If, for example, it is desired to send data on user-defined data channel No. 3, the address port signal 0011 can be placed on the priority data address port. The data encapsulation circuit takes the data channel number information from the priority data address port and incorporates this information in the last four bits of the SPP2 information being used to encapsulate the priority data packet payload. At step 390, the EOP marker is added to the packet. The process then loops back to step 386, so that additional priority data packets can be processed.

Figure 27:
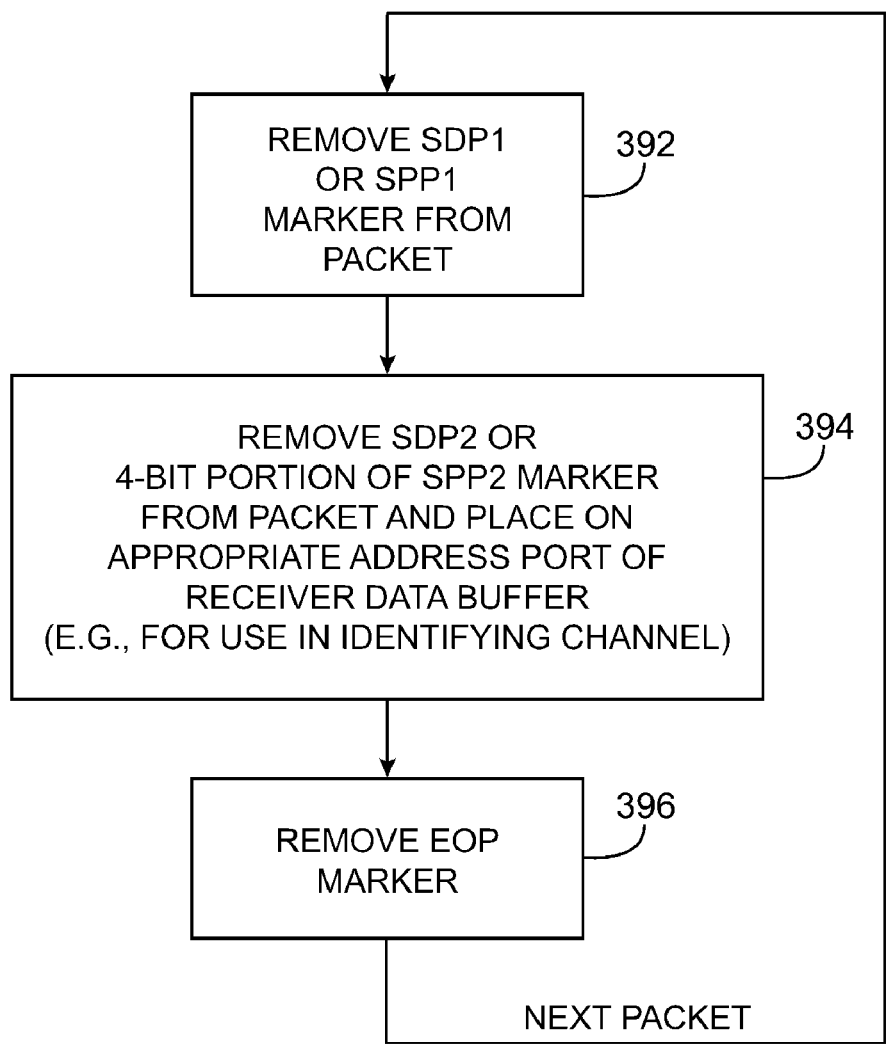
FIG. 27 is a flow chart of illustrative steps involved in extracting embedded data channel information from received packets in integrated circuits in which either a regular data port or a priority data port has been implemented in accordance with the present invention.

When the packets are received at the remote integrated circuit 110, the channel number information used for data channel multiplexing is extracted. Illustrative steps involved in this process are shown in FIG. 27. At step 392, the lane stripping and packet processing circuitry 186 removes the first marker character from the packet. If the packet is a regular data packet, the lane stripping and packet processing circuitry 186 removes the leading SDP1 character. If the packet is a priority data packet, the lane stripping and packet processing circuitry 186 removes the leading SPP1 byte.

At step 394, the second SOP character is extracted from the received packet. If the received packet is a regular data packet, the SDP2 character is extracted. If the received packet is a priority data packet, the SPP2 character is extracted. The data channel number can then be obtained from the 8 bits of SDP2 or (in the case of a priority packet) from the last 4 bits of SPP2. The data channel number may be placed on the appropriate address port 177 of the receiver data buffer 176. The data channel number may then be used by logic circuitry 112 to associate the received packet data with the appropriate user-defined channel number.

At step 396, the EOP information may be removed from the packet, before the process returns to step 392 for handling additional packets.

The user-defined data channel multiplexing feature allows the user to convey data on one or more separate channels on link 14 at the link layer. The data channel information embedded in the SOP markers is used to identify which packets are associated with which data channels. If desired (e.g., if the data channel multiplexing feature is not being used in this way), the data channel label bits may be used to convey other user data.

When retry-on-error capabilities are used, the remote integrated circuit actively acknowledges successfully received data (packets). The local integrated circuit retains transmitted data temporarily in a circular buffer. If the transmitted data is not received properly, it can be retransmitted. The retry-onerror feature, when implemented, therefore helps to ensure successful transmission of data between the local and remote integrated circuits.

Figure 28:
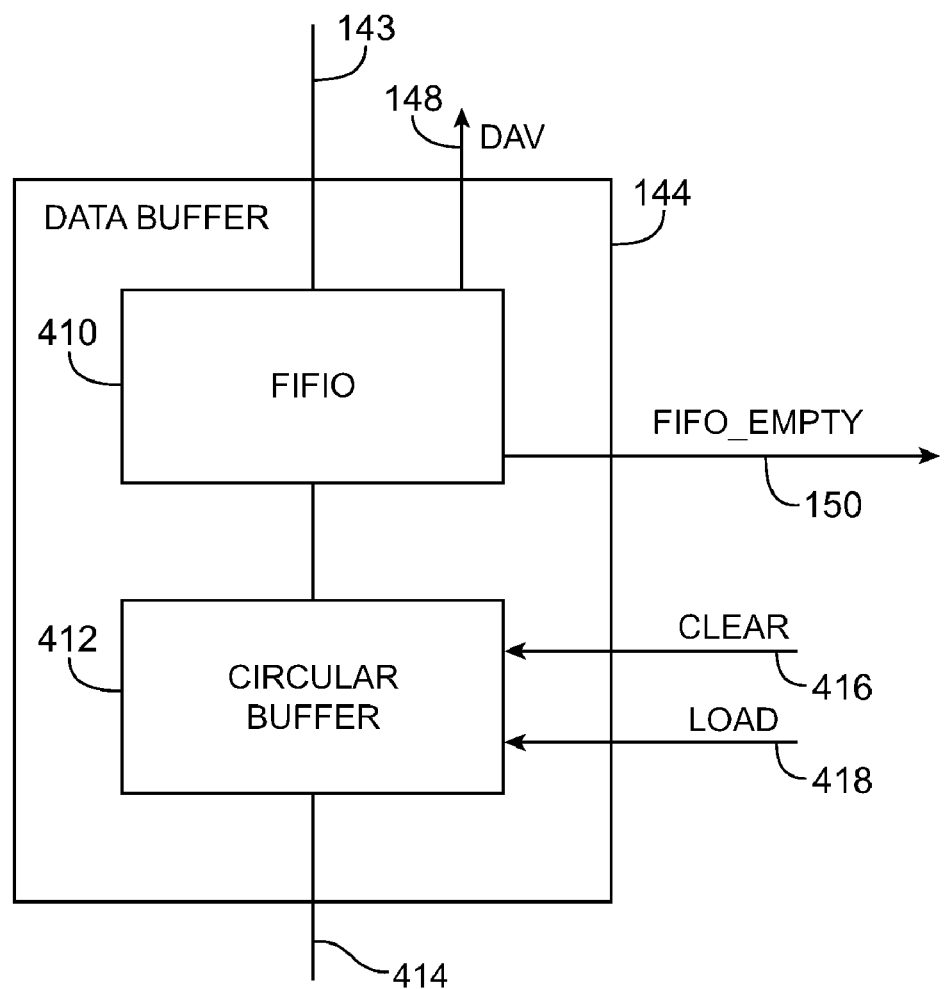
FIG. 28 is a diagram of an illustrative data buffer constructed in accordance with the present invention.

An illustrative data buffer 144 that may be used by a local integrated circuit 110 in which the retry-on-error feature has been implemented is shown in FIG. 28. Data buffer 144 may contain a FIFO 410 and a circular buffer 412. When the FIFO contains more than a threshold amount of data, the DAV signal on line 148 may be deasserted. The signal FIFO_EMPTY on line 150 may be asserted when the FIFO 410 is empty. FIFO 410 provides an interface between the data received from logic 112 on path 143 and the outgoing data for the data encapsulation circuit 152 that is provided on path 414.

Circular buffer 412 may be loaded from FIFO 410 in accordance with loading control signals received at input 418. The buffer 412 contains a number of discrete cells (or discrete packet buffers). If a packet buffer is available, new data is written into that location from FIFO 410. The cells are filled and emptied in order. The buffer is considered to be "circular," because once the end of the buffer has been reached, the usage of the buffer wraps around and starts at the beginning.

Once a packet buffer has been filled, data in that buffer is available to be transmitted to the remote integrated circuit and retransmitted to the remote integrated circuit in the event of a transmission error. Once data from a packet buffer has been successfully transmitted and acknowledged that packet buffer is cleared using one of clear inputs 316 and is made available for a new packet.

Figure 29:
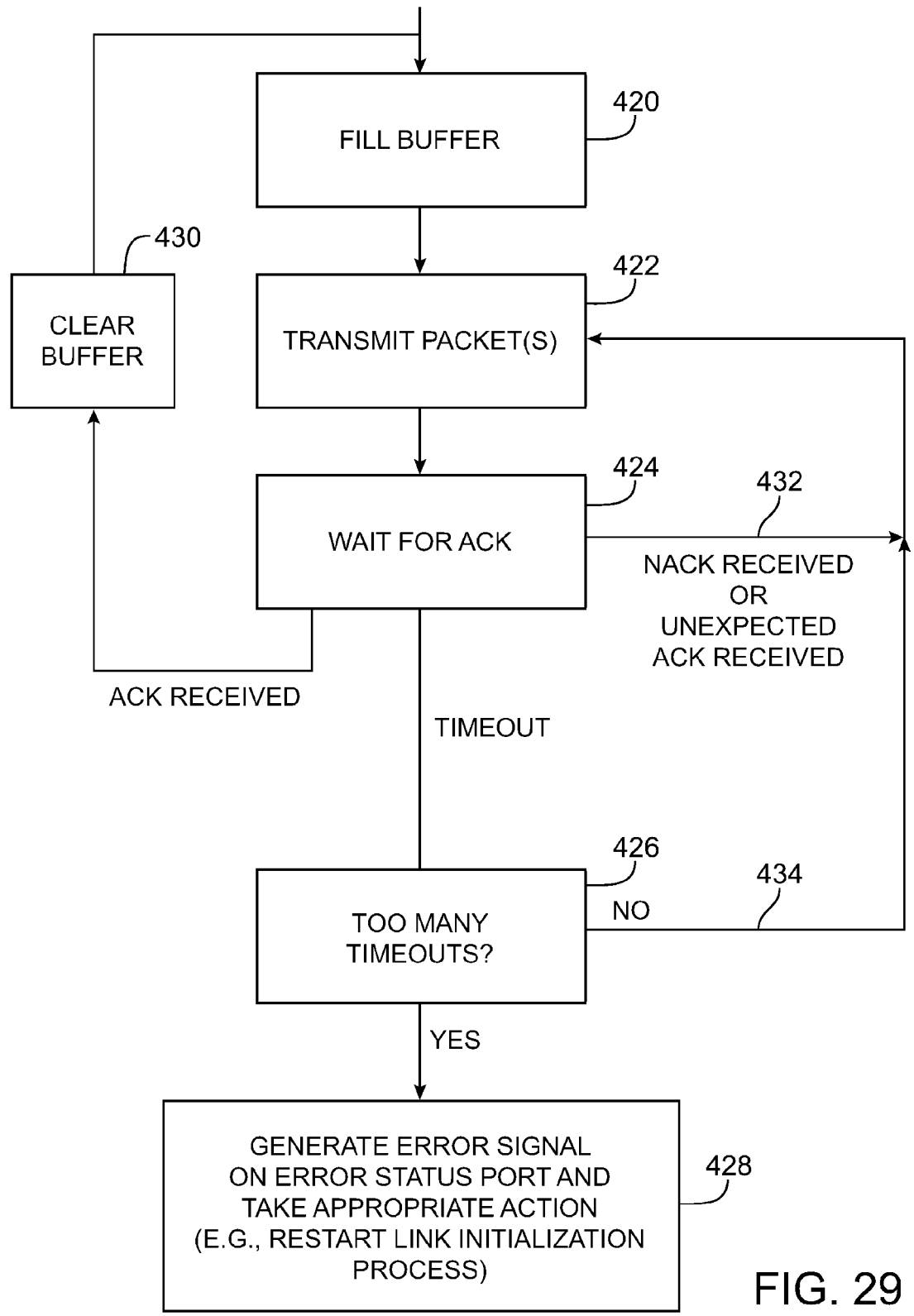
FIG. 29 is a flow chart of illustrative transmission steps involved in a retry-on-error process in accordance with the present invention.

Illustrative steps involved in transmitting data using transmitter circuitry 114 in an integrated circuit 110 in which the optional retry-on-error feature has been implemented are shown in FIG. 29. Initially, data from the logic 112 (FIG. 6) is received into the FIFO 410 of data buffer 144 (FIG. 28). At step 420, data from FIFO 410 is used to fill an appropriate packet buffer in circular buffer 412 (FIG. 28). After the packet buffer has been filled, the data from the packet buffer is encapsulated as a packet by data encapsulation circuit 152 and is transmitted to the remote receiver over link 14 through the data path multiplexer 154 and the remainder of the transmitter circuitry 114. Control circuitry 160 controls the operation of the process.

The transmitted packet will generally be received by the receiver, but in noisy conditions, some packets may be lost or corrupted. With the retry-on-error arrangement, packets that are not successfully received can be retransmitted from the circular buffer 412. Since data is not discarded from the circular buffer until it has been successfully received by the receiver, the retry-on-error scheme helps to avoid problems due to lost packets.

After a packet has been transmitted at step 422, the local integrated circuit uses its receiver circuitry 116 and control circuit 160 to await an acknowledgment signal ACK from the remote integrated circuit (step 424). If the remote integrated circuit successfully receives the transmitted packet, the remote circuit will issue the ACK signal. When the ACK signal is received by the local circuit, buffer 412 is cleared (step 430) and the circuit returns to step 420 to refill the circular buffer with new data.

The remote circuit can issue a negative acknowledge (NACK) signal whenever a packet is not received properly. If a NACK is received from the remote circuit or if an ACK is received when not expected (i.e., an ACK is received for an out-of-order packet), the control circuitry 160 can conclude that there has been a data transmission error. Accordingly, as indicated by line 432, the process can loop back to transmit packet step 422, where the packet or packets can be retransmitted across link 14. Successful transmission will be followed by reception of an ACK signal at step 424.

If too much time elapses during step 424 without reception of an ACK signal or a NACK (i.e., if a timeout condition occurs), the process proceeds to step 426. At step 426 it is determined whether there have already been too many timeouts. If there have not been too many timeouts, the process follows path 434 and attempts again to transmit the packet (step 422). If there have been too many timeouts, this is indicative of a serious problem with the link 14, and the control circuitry 160 can generate an error signal at step 428. In particular, the control circuitry 160 can generate an error signal on error status port 194 and can take additional appropriate actions such as restarting the link initialization process.

Figure 30:
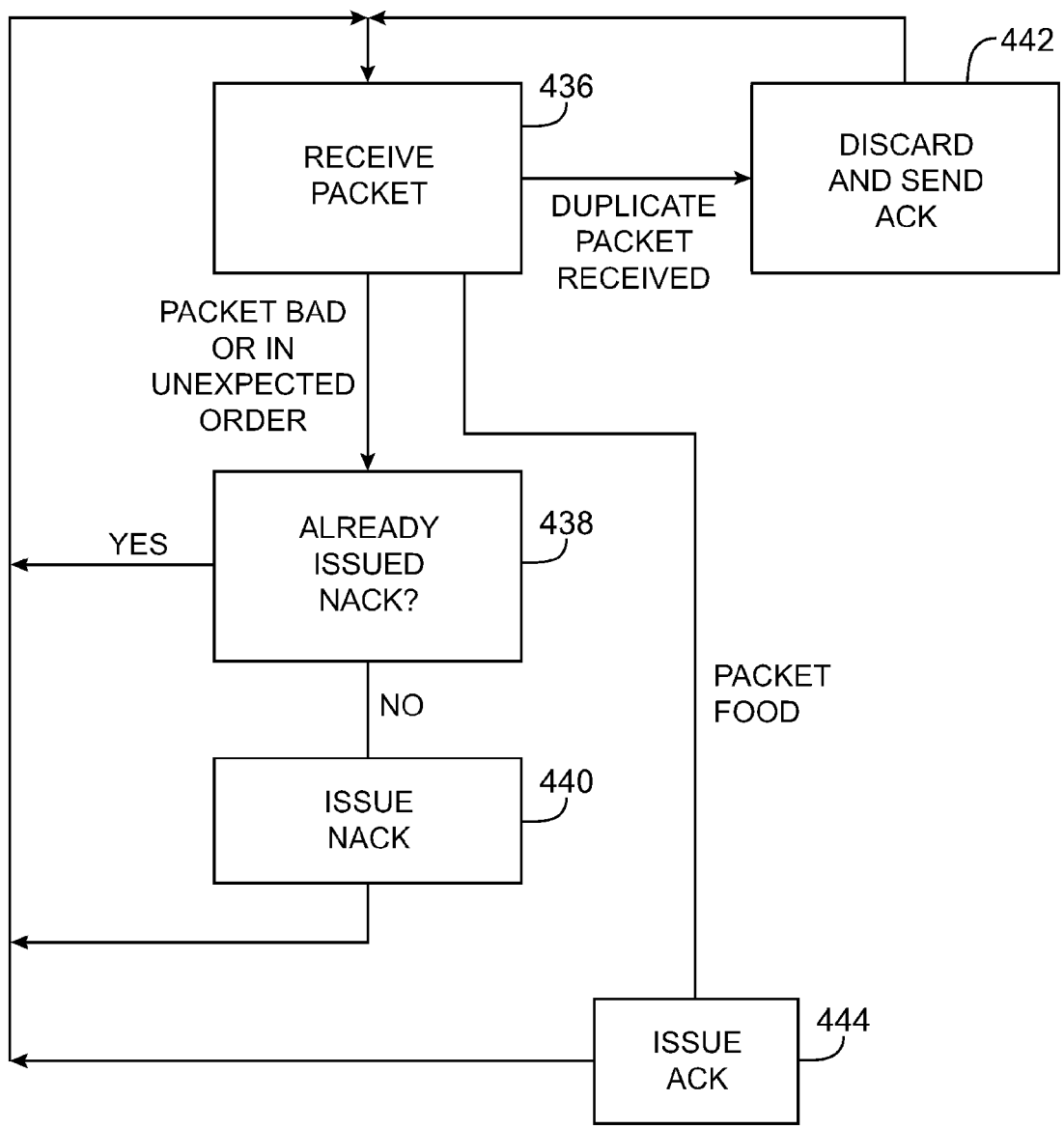
FIG. 30 is a flow chart of illustrative receiver steps involved in a retry-on-error process in accordance with the present invention.

While the local integrated circuit is performing the retry-on-error operations of FIG. 29, the remote circuit with which the local circuit is communicating over link 14 is performing the retry-on-error operations of FIG. 30.

At step 436, the receiver circuitry 116 and control circuitry 160 of the remote circuit receive a packet that has been transmitted from the local circuit over link 14. If a good packet is received, the remote circuit sends an ACK signal back to the local circuit over link 14 (step 444). Packets are labeled with packet numbers at the local circuit. This allows the remote circuit to check packets to determine whether they have arrived in the proper order. If a bad packet is received or if a packet is received that is in an unexpected order, the circuit proceeds to step 438. At step 438, it is determined whether or not a NACK for the bad or mis-ordered packet has already been sent to the local circuit. If a NACK has not already been sent, the remote circuit can send a NACK at step 440 before returning to step 436. If a NACK has already been issued, the remote circuit can return directly to step 336.

If a duplicate packet is received at step 436, the remote circuit can discard the duplicate packet and send another ACK signal to the local circuit (step 442). This helps to ensure that the local circuit will actually receive the ACK, so that the local circuit can clear its buffer and proceed with the transmission of new data.

If the optional retry-on-error feature is not implemented, programmable logic resources and/or hardwired resources on the local and remote integrated circuits are released for use in implementing other functions and/or the circuit size and complexity is reduced.

Figure 31:
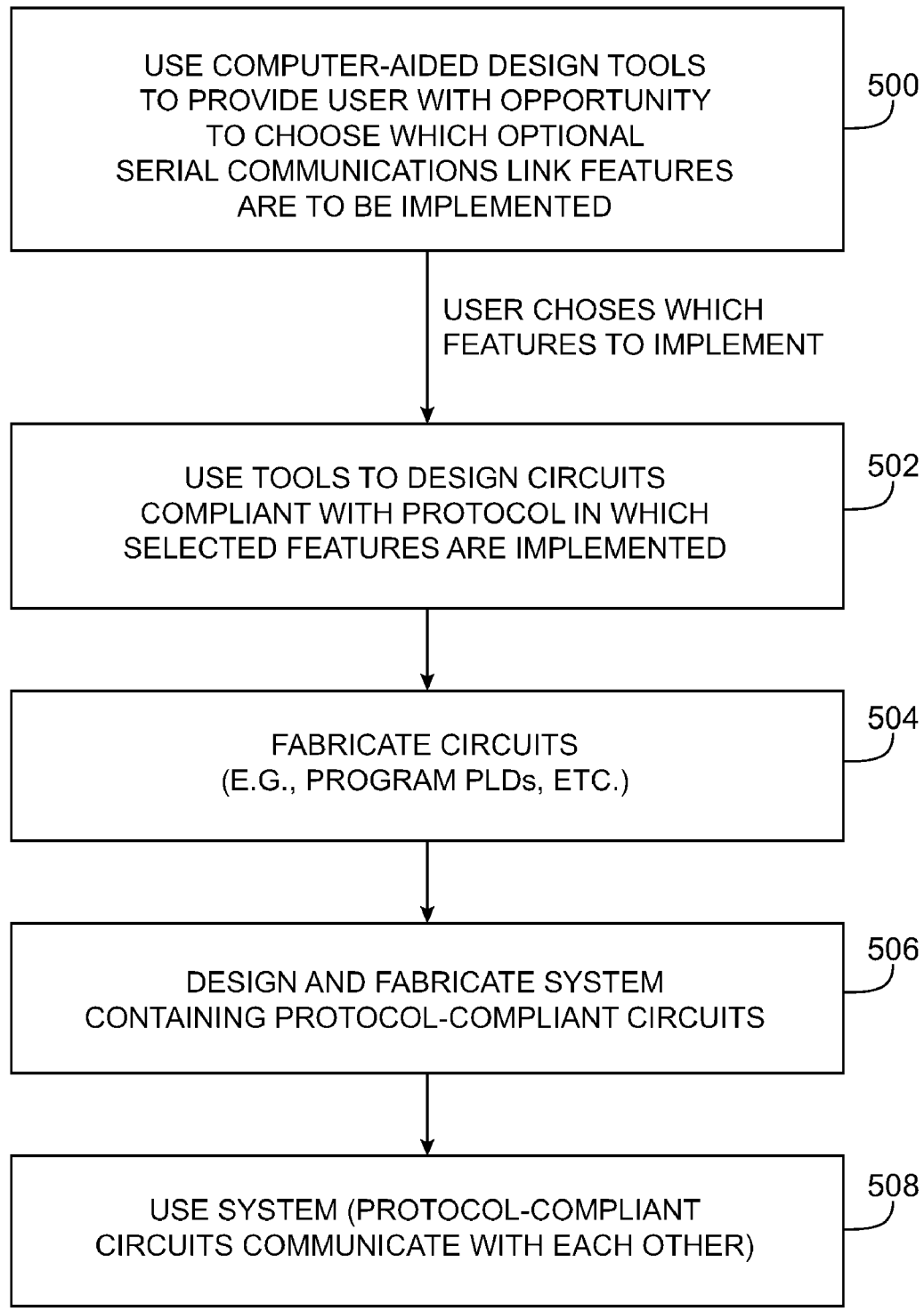
FIG. 31 is a flow chart of steps involved in designing and using integrated circuits that are compliant with a serial communications protocol in accordance with the present invention.

A flow chart of illustrative steps involved in designing and using integrated circuits that are compliant with a serial communications protocol in accordance with the present invention is shown in FIG. 31. At step 500, computer-aided design tools such as the tools 62 of FIG. 4 are used to provide the user (a single person or multi-person logic design team) with an opportunity to choose which optional serial communications link features are to be implemented. The computer-aided design tools may, for example, display on-screen options with which the user may interact by clicking on items of interest. This is merely one illustrative arrangement by which the user can provide instructions to tools 62. Any suitable arrangement may be used if desired.

When designing a given integrated circuit, the user may direct the tools to implement some or all of the optional serial communications features of the serial communications protocol. At step 502, the tools are used to design one or more integrated circuits that are compliant with the serial communication protocol and in which circuitry is included for performing the functions of the selected optional features while omitting unnecessary circuitry (i.e., circuitry for performing the omitted optional features). If a programmable logic device is being designed, the output of the tools 62 may be provided as configuration data. The output of the tools may also be provided in the form of mask set data for producing integrated circuit lithographic masks for fabricating a circuit implementing the desired design.

After the tools 62 have been used to design the circuit(s) at step 502, the circuit(s) can be fabricated at step 504 (e.g., using semiconductor fabrication techniques, by programming a programmable logic device with configuration data, etc.).

At step 506, a system may be designed and fabricated that contains circuits that are compliant with the protocol. Typically, some of the optional features will have been implemented in the circuits and some of the optional features will have been omitted from the circuits. If desired, the system may contain some protocol-compliant circuits that contain all of the optional features. The system may also contain some protocol-compliant circuits in which all of the optional features that can be omitted have been omitted. During the design and fabrication process of step 506, care should be taken to ensure that the circuits that communicate with each other over links 14 in the system are compatible with each other. For example, if the user directs tools 62 to create a given integrated circuit with four lanes in its link 14, the user should design and fabricate the system 10 to ensure that this circuit communicates only with a corresponding four-lane circuit.

At step 508, the system 10 that was constructed at step 506 may be used. Because the circuits that are communicating over links 14 are all compliant with the serial communications protocol of the invention and because their transmitter, receiver, and control circuitry has been configured properly (by proper selection of options), the circuits communicate successfully.

Any suitable graphical user interface may be used by the logic design tool to allow a user to design protocol-compliant integrated circuits for system 10. The graphical user interface may, for example, present the user with screens of clickable options and fillable boxes with which the user can interact to enter and adjust various parameters.

Figure 32:
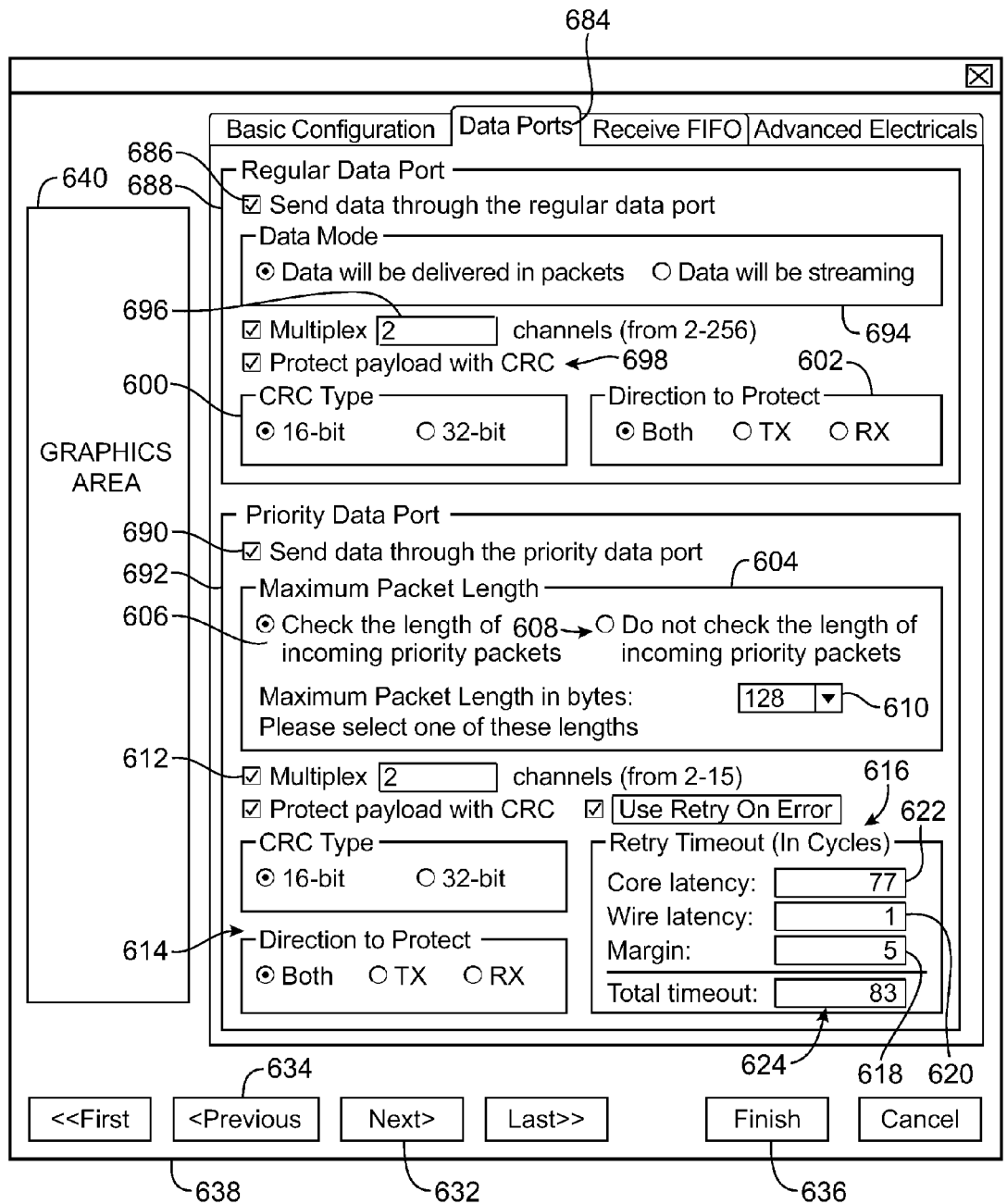
FIG. 32 is an illustrative screen of options that may be presented by a logic design system when designing a system of integrated circuits compliant with a serial communications protocol in accordance with the present invention.

An illustrative screen that the logic design tool (e.g., logic design tool 66 or other tools 62 of FIG. 4) may present to the user is shown in FIG. 32. This type of arrangement is merely illustrative. Any suitable format and set of options on any suitable number of screens may be presented to the user to allow the user to enter design preferences into the logic design tool.

The logic design tool may present a screen 638 that includes a graphics area 640. Graphics area 640 may include a graphical representation of the integrated circuit design specified by the user. For example, when a particular data rate is selected, that data rate may be reflected in the graphics area 640. As another example, the clocking arrangement for the integrated circuit (e.g., a single local clock (XTAL) or separate clocks at the local and remote ends of the link) may be shown graphically in area 640. As features are selected and deselected, the logic design tool can update the contents of graphics area 640 in real time.

Various tabs such as tab 684 may be used to indicate which screen the user is located on. The user can use navigation buttons (e.g., a "next" option 632, a "previous" option 634, etc.) to navigate between screens. A finish option 636 may be selected to end the design process.

In FIG. 32, the user has navigated to a "data ports" screen. The data ports screen of FIG. 32 allows the user to make design decisions related to the regular and priority data ports. For example, the user can use screen 638 to independently select whether or not the regular and priority data ports should have CRC protection and, if so, what strength should be used.

Regular data port option 688 has a box 686 that the user can select when it is desired to implement a regular data port in the design. Priority data port option 692 has a box 690 that the user can click on when it is desired to include a priority port in the integrated circuit being designed. The user may click box 686, box 690, or both boxes 686 and 690. When box 686 is selected, the selections of option 688 may be used to configure the regular data port. When box 690 is selected, the options in option box 692 may be used to configure the priority data port.

Data mode option 694 may be used to select packet data mode or streaming data mode for the regular data port. When the user selects packet data mode, data will be transmitted in packets. When the user selects streaming data mode, data will be transmitted as streaming data. The user can use options (e.g., on another screen) to select whether or not to include clock tolerance compensation codes in the transmitted data. The user can either include clock tolerance compensation or can exclude clock tolerance compensation. Using these options, a user can design an integrated circuit that transmits streaming data without clock tolerance compensation codes, as shown in FIG. 7b.

The user may implement user data channel multiplexing using option 696.

Option 698 may be used to protect (or not protect) the data with data integrity protection (e.g., CRC). Option 600 allows the user to select between CRC-16 and CRC-32 for the regular data port. The user can protect either direction over the link 14, or may protect both directions by appropriate selection of the clickable options within box 602. If the user opts to protect the transmitting direction, the payload will be protected by using CRC redundancy with strength specified using option 600. If the user opts to protect the receiving direction, a protected payload from the remote integrated circuit will be properly checked for errors at the local integrated circuit. The selection of whether or not to protect data with CRC (or other data integrity protection schemes) may be made independently for the transmitting and receiving directions. If protection in only one direction is desired, the user can make an appropriate selection with option 602 and data transmitted in the other direction over the link will not be protected. Both directions can also be protected if desired.

Option 604 may be used to adjust options related to maximum priority packet length. If option 606 is selected, the logic design tool may limit the user to maximum packet lengths of a certain size (e.g., multiples of the bus width). If option 608 is selected, the user may be provided with additional flexibility by not checking the length of incoming priority packets. Box 610 may be used to enter the maximum size (e.g., in bytes) for the priority data packets. In the example of FIG. 32, the maximum size is 128, which makes the transmitting circular buffer smaller. The protocol may limit the maximum packet length to 256 bytes.

Option 612 may be used for user data channel multiplexing. Option 614 may be used in selecting how to implement data integrity protection for the priority data port. Options 614 are independent of options 600 and 602. For example, a user could implement CRC-16 protection on the transmit direction for the regular data port and could implement CRC-32 protection on both the transmit and receive directions for the priority data port.

Retry-on-error option 616 may be used to allow the user to enter, view, and adjust retry-on-error timeout parameters. For example, boxes 618, 620, and 622 may be used in determining an appropriate retry-on-error timeout value for the design. The resulting retry-on-error timeout value is displayed in box 324.

The foregoing is merely illustrative of the principles of this invention and various modifications can be made by those skilled in the art without departing from the scope and spirit of the invention.

What is claimed is:

1. An integrated circuit that is compliant with a serial communications protocol having optional data integrity protection features that are selectable by a user when designing the integrated circuit, wherein the integrated circuit communicates with another integrated circuit over a serial communications link, the integrated circuit comprising:
    transmitter circuitry for transmitting data to the other integrated circuit over the serial communications link; and
    control circuitry that controls the transmitter circuitry, wherein the transmitter circuitry and control circuitry comprise first and second data ports, and wherein the optional data integrity protection features are selected by the user so that the first data port has data integrity protection capabilities and the second data port does not have data integrity protection capabilities, and wherein data packets on one of the first and second data ports are nested within data packets on the other of the first and second data ports.

2. The integrated circuit defined in claim 1 wherein the first data port comprises a regular data port and wherein the second data port comprises a priority data port.

3. The integrated circuit defined in claim 1 wherein the first data port comprises a priority data port, wherein the second data port comprises a regular data port, and wherein the integrated circuit comprises programmable logic.

4. The integrated circuit defined in claim 1 wherein the data integrity protection capabilities of the first data port comprise cyclic redundancy checking capabilities, the integrated circuit further comprising a data encapsulation circuit that adds cyclic redundancy checking information to the transmitted data.

5. The integrated circuit defined in claim 1 wherein the data integrity protection capabilities of the first data port comprise CRC-16 capabilities, the integrated circuit further comprising a data encapsulation circuit that adds cyclic redundancy checking information to the transmitted data.

6. The integrated circuit defined in claim 1 further comprising receiver circuitry for receiving data from the other integrated circuit over the serial communications link without data integrity protection.

7. An integrated circuit that communicates over a serial communications link having multiple lanes, comprising:
    logic circuitry that produces data; and
    input/output circuitry that transmits the data over the multiple lanes of the serial communications link, wherein the input/output circuitry comprises a priority data port that performs retry-on-error and user-defined data channel multiplexing operations, wherein the user-defined data channel multiplexing operations of the input/output circuitry are used to establish multiple user-defined data channels over the multiple lanes of the link and wherein the input/output circuitry comprises circuitry that encapsulates the transmitted data in packets between start-of-packet and end-of-packet marker information, wherein the start-of-packet marker information for each packet includes a channel number associated with one of the multiple user-defined channels.

8. The integrated circuit defined in claim 7 wherein there are a given number of the multiple lanes and a given number of the multiple user-defined data channels, the integrated circuit further comprising data encapsulation circuitry that encapsulates the transmitted data in packets, wherein the given number of multiple lanes differs from the given number of multiple user-defined data channels.

9. A method of communicating data over a serial communications link having multiple lanes using first and second integrated circuits that are compliant with a serial communications protocol that supports user-defined data channel multiplexing in which a user defines multiple user-defined data channels for carrying data over the multiple lanes of the serial communications link and that supports retry-on-error operations, the method comprising:
    producing data on the first integrated circuit;
    labeling the data with channel number information for each of the user-defined channels;
    transmitting the data over the user-defined channels using the lanes of the serial communications link;
    receiving the transmitted data with the second integrated circuit;
    checking the transmitted data for errors at the second integrated circuit; and
    if an error is detected, performing retry-on-error resend operations with the first integrated circuit.

10. The method defined in claim 9 wherein transmitting the data comprises transmitting the data in priority packets, each priority packet having start-of-packet and end-of-packet marker information and cyclic redundancy check (CRC) data integrity protection information.

11. The method defined in claim 9 wherein transmitting the data comprises transmitting the data in priority packets, each priority packet having start-of-packet and end-of-packet marker information and cyclic redundancy check (CRC) data integrity protection information, wherein the channel number information is contained in the start-of-packet marker information.

12. The method defined in claim 9 wherein the integrated circuits are programmable logic devices, wherein transmitting the data comprises transmitting the data in priority packets, each priority packet having start-of-packet and end-of-packet marker information and cyclic redundancy check (CRC) data integrity protection information, wherein the channel number information is contained in the start-of-packet marker information, the method further comprising transmitting idle codes and clock compensation codes with the data.

13. An integrated circuit that is compliant with a serial communications protocol that supports a user-configurable data port with a streaming data mode in which data is transmitted as streaming data and a packet data mode in which data is transmitted in packets depending on which mode is selected by a user when designing the integrated circuit and that supports a user-configurable clock tolerance compensation option that the user can select when designing the integrated circuit to either include or not include clock tolerance compensation codes in data transmitted with the data port, the integrated circuit comprising:
    core circuitry that produces data; and
    output circuitry that transmits the data over multiple lanes in a serial communications link, wherein the output circuitry comprises a data port configured by the user to operate in the streaming data mode with or without including clock tolerance compensation codes, wherein the output circuitry includes a regular data port and a priority data port, wherein the data that is transmitted over the multiple lanes of the serial communications link includes regular data from the regular data port and priority data from the priority data port, and wherein when priority data is transmitted, the priority data is nested within the regular data.

14. The integrated circuit defined in claim 13 wherein the output circuitry comprises an idle code generator that generates idle codes that are inserted into gaps in the transmitted data.

15. A method of transmitting data over a serial communications link having multiple lanes using an integrated circuit that is compliant with a serial communications protocol, wherein the serial communications protocol has optional features that a user can configure when designing the integrated circuit, wherein the optional features of the serial communications protocol include a user-defined data channel multiplexing feature, a retry-on-error feature, a clock tolerance compensation feature, and a data transmission mode feature for transmitting data in a streaming data mode or a packetized data mode, the method comprising:

producing data on the integrated circuit; and using a regular data port on the integrated circuit that is operating in the streaming data mode to transmit the data as streaming data over the multiple lanes of the serial communications link without clock tolerance compensation codes.

16. A method of transmitting data over a serial communications link having multiple lanes using an integrated circuit that is compliant with a serial communications protocol, wherein the serial communications protocol has optional features that a user can configure when designing the integrated circuit, wherein the optional features of the serial communications protocol include a data integrity protection feature, a retry-on-error feature, and a clock tolerance compensation feature, the method comprising:

producing data on the integrated circuit;

using a regular data port and a priority data port on the integrated circuit to transmit the data over the multiple lanes of the serial communications link in regular data packets and priority data packets, wherein the priority data packets include cyclic redundancy checking information and the regular data packets do not include cyclic redundancy checking information; and using the priority data port to perform retry-on-error operations in which some of the transmitted data is retransmitted.

17. The method defined in claim 16, wherein the optional features include a user-defined data channel multiplexing feature, the method further comprising:

labeling at least some of the packets with channel number information for each of multiple user-defined channels for the user-defined data channel multiplexing feature; and using the priority data port to transmit the labeled data over the multiple lanes of the serial communications link.

18. The method defined in claim 17, wherein the integrated circuit includes programmable logic and wherein producing the data comprises using the programmable logic to produce the data, the method further comprising inserting clock tolerance compensation codes into the transmitted data.

\* \* \* \* \*